(12) United States Patent
Garcia et al.

(10) Patent No.: US 8,462,207 B2
(45) Date of Patent: Jun. 11, 2013

(54) DEPTH RANGING WITH MOIRÉ PATTERNS

(75) Inventors: Javier Garcia, Valencia (ES);
Alexander Shpunt, Petach Tikva (IL)

(73) Assignee: Primesense Ltd., Tel Aviv (IL)

( * ) Notice: Subject to any disclaimer, the term of this patent is extended or adjusted under 35 U.S.C. 154(b) by 483 days.

(21) Appl. No.: 12/703,794

(22) Filed: Feb. 11, 2010

(65) Prior Publication Data

US 2010/0201811 A1   Aug. 12, 2010

Related U.S. Application Data

(60) Provisional application No. 61/151,853, filed on Feb. 12, 2009.

(51) Int. Cl.
*H04N 7/18* (2006.01)
(52) U.S. Cl.
USPC .......................... 348/136; 348/135; 348/137
(58) Field of Classification Search
USPC .......................... 348/135, 136, 137
See application file for complete search history.

(56) References Cited

U.S. PATENT DOCUMENTS

| 4,336,978 A | 6/1982 | Suzuki |
| 4,542,376 A | 9/1985 | Bass et al. |
| 4,802,759 A | 2/1989 | Matsumoto et al. |
| 4,843,568 A | 6/1989 | Krueger et al. |
| 5,075,562 A | 12/1991 | Greivenkamp et al. |
| 5,483,261 A | 1/1996 | Yasutake |
| 5,630,043 A | 5/1997 | Uhlin |
| 5,636,025 A | 6/1997 | Bieman et al. |
| 5,835,218 A * | 11/1998 | Harding .................. 356/521 |
| 5,838,428 A | 11/1998 | Pipitone et al. |
| 5,856,871 A | 1/1999 | Cabib et al. |
| 5,909,312 A | 6/1999 | Mendlovic et al. |
| 6,041,140 A | 3/2000 | Binns et al. |
| 6,081,269 A | 6/2000 | Quarendon |
| 6,084,712 A * | 7/2000 | Harding .................. 359/618 |
| 6,088,105 A * | 7/2000 | Link ....................... 356/618 |
| 6,099,134 A | 8/2000 | Taniguchi et al. |
| 6,100,517 A | 8/2000 | Yahav et al. |

(Continued)

FOREIGN PATENT DOCUMENTS

| DE | 19736169 A1 | 8/1997 |
| DE | 19638727 A1 | 3/1998 |

(Continued)

OTHER PUBLICATIONS

Chinese Patent Application # 200780006560.6 Official Action dated Oct. 11, 2010.

(Continued)

*Primary Examiner* — Sath V Perungavoor
*Assistant Examiner* — Jeffery Williams
(74) *Attorney, Agent, or Firm* — D. Kligler I.P. Services Ltd.

(57) ABSTRACT

A method for three-dimensional mapping of an object, including projecting with a projector a set of fringes on the object and capturing an image of the object in a camera. The method further includes processing the captured image so as to detect a Moiré pattern associated with the object and so as to extract depth information from the Moiré pattern, and configuring the projector and the camera so that a locally unambiguous characteristic of the Moiré pattern is related to a depth of the object.

34 Claims, 13 Drawing Sheets

U.S. PATENT DOCUMENTS

| | | | |
|---|---|---|---|
| 6,101,269 A | 8/2000 | Hunter et al. | |
| 6,108,036 A * | 8/2000 | Harada et al. | 348/219.1 |
| 6,167,151 A | 12/2000 | Albeck | |
| 6,259,561 B1 | 7/2001 | George et al. | |
| 6,262,740 B1 | 7/2001 | Lauer et al. | |
| 6,268,923 B1 * | 7/2001 | Michniewicz et al. | 356/512 |
| 6,301,059 B1 | 10/2001 | Huang et al. | |
| 6,438,263 B2 | 8/2002 | Albeck et al. | |
| 6,494,837 B2 | 12/2002 | Kim et al. | |
| 6,495,848 B1 | 12/2002 | Rubbert | |
| 6,686,921 B1 | 2/2004 | Rushmeier et al. | |
| 6,700,669 B1 | 3/2004 | Geng | |
| 6,731,391 B1 * | 5/2004 | Kao et al. | 356/605 |
| 6,741,251 B2 | 5/2004 | Malzbender | |
| 6,751,344 B1 | 6/2004 | Grumbine | |
| 6,754,370 B1 | 6/2004 | Hall-Holt et al. | |
| 6,759,646 B1 | 7/2004 | Acharya et al. | |
| 6,803,777 B2 | 10/2004 | Pfaff et al. | |
| 6,810,135 B1 | 10/2004 | Berenz et al. | |
| 6,813,440 B1 | 11/2004 | Yu et al. | |
| 6,825,985 B2 | 11/2004 | Brown et al. | |
| 6,841,780 B2 * | 1/2005 | Cofer et al. | 250/341.1 |
| 6,859,326 B2 | 2/2005 | Sales | |
| 6,937,348 B2 | 8/2005 | Geng | |
| 7,006,952 B1 | 2/2006 | Matsumoto et al. | |
| 7,009,742 B2 | 3/2006 | Brotherton-Ratcliffe et al. | |
| 7,013,040 B2 | 3/2006 | Shiratani | |
| 7,076,024 B2 | 7/2006 | Yokhin | |
| 7,112,774 B2 | 9/2006 | Baer | |
| 7,120,228 B2 | 10/2006 | Yokhin et al. | |
| 7,127,101 B2 | 10/2006 | Littlefield et al. | |
| 7,194,105 B2 * | 3/2007 | Hersch et al. | 382/100 |
| 7,231,069 B2 | 6/2007 | Nahata | |
| 7,256,899 B1 | 8/2007 | Faul et al. | |
| 7,335,898 B2 | 2/2008 | Donders et al. | |
| 7,369,685 B2 | 5/2008 | DeLean | |
| 7,385,708 B2 | 6/2008 | Ackerman et al. | |
| 7,433,024 B2 | 10/2008 | Garcia et al. | |
| 7,551,719 B2 | 6/2009 | Yokhin et al. | |
| 7,560,679 B1 | 7/2009 | Gutierrez | |
| 7,659,995 B2 | 2/2010 | Knighton et al. | |
| 7,700,904 B2 | 4/2010 | Toyoda et al. | |
| 7,751,063 B2 | 7/2010 | Dillon et al. | |
| 7,840,031 B2 | 11/2010 | Albertson et al. | |
| 7,952,781 B2 | 5/2011 | Weiss et al. | |
| 8,018,579 B1 | 9/2011 | Krah | |
| 8,035,806 B2 | 10/2011 | Jin et al. | |
| 8,126,261 B2 | 2/2012 | Medioni et al. | |
| 8,326,025 B2 | 12/2012 | Boughorbel | |
| 2001/0016063 A1 | 8/2001 | Albeck et al. | |
| 2002/0041327 A1 | 4/2002 | Hildreth et al. | |
| 2002/0075456 A1 | 6/2002 | Shiratani | |
| 2003/0048237 A1 | 3/2003 | Sato et al. | |
| 2003/0057972 A1 | 3/2003 | Pfaff et al. | |
| 2003/0156756 A1 | 8/2003 | Gokturk et al. | |
| 2004/0001145 A1 | 1/2004 | Abbate | |
| 2004/0105580 A1 | 6/2004 | Hager et al. | |
| 2004/0130730 A1 | 7/2004 | Cantin et al. | |
| 2004/0130790 A1 | 7/2004 | Sales | |
| 2004/0174770 A1 | 9/2004 | Rees | |
| 2004/0213463 A1 | 10/2004 | Morrison | |
| 2004/0218262 A1 | 11/2004 | Chuang et al. | |
| 2004/0228519 A1 | 11/2004 | Littlefield et al. | |
| 2005/0018209 A1 | 1/2005 | Lemelin et al. | |
| 2005/0052637 A1 | 3/2005 | Shaw et al. | |
| 2005/0111705 A1 | 5/2005 | Waupotitsch et al. | |
| 2005/0200925 A1 | 9/2005 | Brotherton-Ratcliffe et al. | |
| 2005/0231465 A1 | 10/2005 | DePue et al. | |
| 2005/0271279 A1 | 12/2005 | Fujimura et al. | |
| 2006/0017656 A1 | 1/2006 | Miyahara | |
| 2006/0072851 A1 | 4/2006 | Kang et al. | |
| 2006/0156756 A1 | 7/2006 | Becke | |
| 2006/0221218 A1 | 10/2006 | Adler et al. | |
| 2006/0221250 A1 | 10/2006 | Rossbach et al. | |
| 2006/0269896 A1 | 11/2006 | Liu et al. | |
| 2007/0057946 A1 | 3/2007 | Albeck et al. | |
| 2007/0060336 A1 | 3/2007 | Marks et al. | |
| 2007/0133840 A1 | 6/2007 | Cilia | |
| 2007/0165243 A1 | 7/2007 | Kang et al. | |
| 2008/0018595 A1 | 1/2008 | Hildreth et al. | |
| 2008/0031513 A1 | 2/2008 | Hart | |
| 2008/0106746 A1 | 5/2008 | Shpunt et al. | |
| 2008/0118143 A1 | 5/2008 | Gordon et al. | |
| 2008/0198355 A1 | 8/2008 | Domenicali et al. | |
| 2008/0212835 A1 | 9/2008 | Tavor | |
| 2008/0240502 A1 | 10/2008 | Freedman et al. | |
| 2008/0247670 A1 | 10/2008 | Tam et al. | |
| 2008/0278572 A1 | 11/2008 | Gharib et al. | |
| 2009/0016642 A1 | 1/2009 | Hart | |
| 2009/0060307 A1 | 3/2009 | Ghanem et al. | |
| 2009/0096783 A1 | 4/2009 | Shpunt et al. | |
| 2009/0183125 A1 | 7/2009 | Magal et al. | |
| 2009/0183152 A1 | 7/2009 | Yang et al. | |
| 2009/0185274 A1 | 7/2009 | Shpunt | |
| 2009/0226079 A1 | 9/2009 | Katz et al. | |
| 2009/0244309 A1 | 10/2009 | Maison et al. | |
| 2010/0007717 A1 | 1/2010 | Spektor et al. | |
| 2010/0013860 A1 | 1/2010 | Mandella et al. | |
| 2010/0020078 A1 | 1/2010 | Shpunt | |
| 2010/0118123 A1 | 5/2010 | Freedman et al. | |
| 2010/0128221 A1 | 5/2010 | Muller et al. | |
| 2010/0142014 A1 | 6/2010 | Rosen et al. | |
| 2010/0177164 A1 | 7/2010 | Zalevsky et al. | |
| 2010/0182406 A1 | 7/2010 | Benitez | |
| 2010/0194745 A1 | 8/2010 | Leister et al. | |
| 2010/0201811 A1 | 8/2010 | Garcia et al. | |
| 2010/0225746 A1 | 9/2010 | Shpunt et al. | |
| 2010/0243899 A1 | 9/2010 | Ovsiannikov et al. | |
| 2010/0245826 A1 | 9/2010 | Lee | |
| 2010/0265316 A1 | 10/2010 | Sali et al. | |
| 2010/0278384 A1 | 11/2010 | Shotton et al. | |
| 2010/0284082 A1 | 11/2010 | Shpunt et al. | |
| 2010/0290698 A1 | 11/2010 | Shpunt et al. | |
| 2010/0303289 A1 | 12/2010 | Polzin et al. | |
| 2011/0001799 A1 | 1/2011 | Rothenberger et al. | |
| 2011/0025827 A1 | 2/2011 | Shpunt et al. | |
| 2011/0074932 A1 | 3/2011 | Gharib et al. | |
| 2011/0096182 A1 | 4/2011 | Cohen et al. | |
| 2011/0134114 A1 | 6/2011 | Rais et al. | |
| 2011/0158508 A1 | 6/2011 | Shpunt et al. | |
| 2011/0211044 A1 | 9/2011 | Shpunt et al. | |
| 2011/0279648 A1 | 11/2011 | Lutian et al. | |
| 2011/0285910 A1 | 11/2011 | Bamji et al. | |
| 2012/0012899 A1 | 1/2012 | Jin et al. | |
| 2012/0051588 A1 | 3/2012 | McEldowney | |

FOREIGN PATENT DOCUMENTS

| | | |
|---|---|---|
| GB | 2352901 A | 2/2001 |
| JP | 62206684 A | 9/1987 |
| JP | 01-240863 | 9/1989 |
| JP | 03-029806 U | 2/1991 |
| JP | H03-040591 A | 2/1991 |
| JP | 06-273432 | 9/1994 |
| JP | H08-186845 A | 7/1996 |
| JP | H10-327433 A | 12/1998 |
| JP | 2001141430 A | 5/2001 |
| JP | 2002122417 A | 4/2002 |
| JP | 2002-152776 A | 5/2002 |
| JP | 2002-213931 A | 7/2002 |
| JP | 2002-365023 A | 12/2002 |
| JP | 2006-128818 A | 5/2006 |
| WO | 9303579 A1 | 2/1993 |
| WO | 199303579 A1 | 2/1993 |
| WO | 9827514 A2 | 6/1998 |
| WO | 9828593 A1 | 7/1998 |
| WO | 9828593 A2 | 7/1998 |
| WO | 2005010825 A2 | 2/2005 |
| WO | 2007043036 A1 | 4/2007 |
| WO | 2007096893 A2 | 8/2007 |
| WO | 2007105205 A2 | 9/2007 |
| WO | 2007105215 A2 | 9/2007 |
| WO | 2008120217 A2 | 10/2008 |

OTHER PUBLICATIONS

International Application PCT/IB2010/053430 Search Report dated Dec. 28, 2010.

Scharstein et al., "High-Accuracy Stereo Depth Maps Using Structured Light", IEEE Proceedings of the Conference on Computer Vision and Pattern Recognition, pp. 165-171, Jun. 18, 2003.

Koschan et al., Dense Depth Maps by Active Color Illumination and Image Pyramids, Advances in Computer Vision, pp. 137-148, Springer 1997.

Marcia et al., "Fast Disambiguation of Superimposed Images for Increased Field of View", IEEE International Conference on Image Processing, San Diego, USA, Oct. 12-15, 2008.

U.S. Appl. No. 12/844,864 "Depth Mapping Based on Pattern Matching and Stereoscopic Information" filed Jul. 28, 2010.

Microvision Inc., "Micro-Electro-Mechanical System (MEMS) Scanning Mirror", years 1996-2009.

U.S. Appl. No. 61/372,729 "Scanning projectors for 3D mapping" filed Aug. 11, 2010.

U.S. Appl. No. 61/425,788 "Scanning projectors and image capture modules" filed Dec. 22, 2010.

U.S. Appl. No. 61/415,352 "Depth mapping using time-coded illumination" filed Nov. 19, 2010.

U.S. Appl. No. 61/419,891 "Lens Arrays for Pattern Projection and Imaging" filed Dec. 6, 2010.

U.S. Appl. No. 61/309,000 "Commitment-Based Resource Allocation for 3D Mapping" filed Mar. 1, 2010.

Btendo, "Two Uni-axial Scanning Mirrors Vs One Bi-axial Scanning Mirror", Kfar Saba, Israel, Aug. 13, 2008.

Japanese Patent Application # 2008558981 Official Action dated Nov. 2, 2011.

U.S. Appl. No. 12/522,171 Official Action dated Dec. 22, 2011.

U.S. Appl. No. 12/522,172 Official Action dated Nov. 30, 2011.

Japanese Patent Application # 2008558984 Official Action dated Nov. 1, 2011.

U.S. Appl. No. 13/043,488 Official Action dated Jan. 3, 2012.

Japanese Patent Application # 2008535179 Official Action dated Nov. 8, 2011.

Chinese Patent Application # 2006800038004.2 Official Action dated Nov. 24, 2011.

Marcia et al., "Superimposed Video Disambiguation for Increased Field of View", Optics Express 16:21, pp. 16352-16363, year 2008.

Guan et al., "Composite Structured Light Pattern for Three Dimensional Video", Optics Express 11:5, pp. 406-417, year 2008.

U.S. Appl. No. 13/311,584, filed Dec. 6, 2011.

PCT Application PCT/IB2011/055155 filed on Nov. 17, 2011.

International Application No. PCT/IB2010/053430 Search Report dated Dec. 28, 2010.

Chinese Patent Application # 200680038004.2 Official Action dated Dec. 24, 2010.

Yao Kun et al., "Measurment of Space Distribution of Laser Gaussian Beam by Speckles Displacement Method", High Power Laser and Particle Beams, vol. 12, No. 2, pp. 141-144, Apr. 30, 2000.

Zhu et al., "Fusion of time-of-flight depth and stereo for high accuracy depth maps", Proceedings of the IEEE Conference on Computer Vision and Pattern Recognition, pp. 1-8, Jun. 23, 2008.

Koschan et al., "Dense Depth Maps by Active Color Illumination and Image Pyramids", Advances in Computer Vision, pp. 137-148, 1997.

Scharstein et al., "High-Accuracy Stereo Depth Maps Using Structured Light", IEEE Proceedings of the Computer Society Conference on Computer Vision and Pattern Recognition, pp. 165-171, Jun. 18, 2003.

Chinese Patent Application # 200780016625.5 Official Action dated Oct. 26, 2010.

Chinese Patent Application # 200780006560.6 Official Action dated Feb. 1, 2011.

U.S. Appl. No. 12/522,171 Official Action dated Apr. 5, 2012.

U.S. Appl. No. 12/397,362 Official Action dated Apr. 24, 2012.

International Application PCT/IB2011/053560 Search Report dated Jan. 19, 2012.

International Application PCT/IB2011/055155 Search Report dated Apr. 20, 2012.

U.S. Appl. No. 13/311,589, filed Dec. 6, 2011.

U.S. Appl. No. 13/437,977, filed Apr. 3, 2012.

U.S. Appl. No. 61/598,921, filed Feb. 15, 2012.

Richardson, W. H., "Bayesian-Based Iterative Method of Image Restoration", Journal of the Optical Society of America, vol. 62, No. 1, pp. 55-59, Jan. 1972.

Omnivision Technologies Inc., "OV2710 1080p/720p HD Color CMOS Image Sensor with OmniPixel3-HS Technology", Dec. 2011.

Lavoie et al., "3-D Object Model Recovery From 2-D Images Using Structured Light", IEEE Transactions on Instrumentation and Measurement, vol. 53, No. 2, pp. 437-443, Apr. 2004.

Chinese Application # 200780016625.5 Office Action dated May 12, 2011.

U.S. Appl. No. 11/899,542 Office Action dated Apr. 4, 2011.

U.S. Appl. No. 11/724,068 Office Action dated Mar. 1, 2011.

Chinese Application # 200780009053.8 Office Action dated Mar. 10, 2011.

Japanese Application # 2008535179 Office Action dated Apr. 1, 2011.

Kun et al., "Gaussian Laser Beam Spatial Distribution Measurement by Speckles Displacement Method", HICH Power Laser and Particle Beams, vol. 12, No. 2, Apr. 2000.

Hart, D., U.S. Appl. No. 09/616,606 "Method and System for High Resolution , Ultra Fast 3-D Imaging" filed Jul. 14, 2000.

International Application PCT/IL2007/000306 Search Report dated Oct. 2, 2008.

International Application PCT/IL20027/000262 Search Report dated Oct. 16, 2008.

International Application PCT/IL2008/000458 Search Report dated Oct. 28, 2008.

International Application PCT/IL2007/000327 Search Report dated Sep. 26, 2008.

Takeda et al., "Fourier Transform Methods of Fringe-Pattern Analysis for Computer-Based Topography and Interferometry", Journal of Optical Society of America, vol. 72, No. 1, Jan. 1982.

Sazbon et al., "Qualitative real-time range extraction for preplanned scene partitioning using laser beam coding", Pattern Recognition Letters 26, pp. 1772-1781, year 2005.

Sjodahl et al., "Measurement of shape by using projected random and patterns and temporal digital speckle photography", Applied Optics, vol. 38, No. 10, Apr. 1, 1999.

Garcia et al., "Three dimensional mapping and range measurement by means of projected speckle patterns", Applied Optics, vol. 47, No. 16, Jun. 1, 2008.

Chen et al., "Measuring of a Three-Dimensional Surface by Use of a Spatial Distance Computation", Applied Optics, vol. 42, issue 11, pp. 1958-1972, 2003.

Ypsilos et al., "Speech-driven Face Synthesis from 3D Video", 2nd International Symposium on 3D Processing, Visualization and Transmission, Thessaloniki, Greece, Sep. 6-9, 2004.

Hanson et al. "Optics and Fluid Dynamics Department", Annual Progress Report for 1997 (an abstract).

International Application PCT/IL2006/000335 Preliminary Report on Patentability dated Apr. 24, 2008.

International Application PCT/IL2008/000095 Search Report dated Jul. 24, 2008.

International Application PCT/IL2009/000285 Search Report dated Jun. 11, 2009.

Goodman, J.W., "Statistical Properties of Laser Speckle Patterns", Laser Speckle and Related Phenomena, pp. 9-75, Springer-Verlag, Berlin Heidelberg, 1975.

Doty, J.L., "Projection Moire for Remote Contour Analysis", Journal of Optical Society of America, vol. 73, No. 3, pp. 366-372, Mar. 1983.

Avidan et al., "Trajectory triangulation: 3D reconstruction of moving points from amonocular image sequence", IEEE Transactions on Pattern Analysis and Machine Intelligence, vol. 22, No. 4, pages, Apr. 2000.

Leclerc et al., "The direct computation of height from shading", Proceedings of Computer Vision and Pattern Recognition, pp. 552-558, year 1991.

Zhang et al., "Shape from intensity gradient", IEEE Transactions on Systems, Man and Cybernetics—Part A: Systems and Humans, vol. 29, No. 3, pp. 318-325, May 1999.

Zhang et al., "Height recovery from intensity gradients", Proceedings of IEEE Computer Society Conference on Computer Vision and Pattern Recognition, pp. 508-513, year 1994.

Horn, B., "Height and gradient from shading", International Journal of Computer Vision, No. 5, pp. 37-76, year 1990.

Bruckstein, A., "On shape from shading", Computer Vision, Graphics, and Image Processing, vol. 44, pp. 139-154, year 1988.

Zhang et al., "Rapid Shape Acquisition Using Color Structured Light and Multi-Pass Dynamic Programming", 1st International Symposium on 3D Data Processing Visualization and Transmission (3DPVT), Padova, Italy, Jul. 2002.

Besl, P., "Active Optical Range Imaging Sensors", Machine Vision and Applications, No. 1, pp. 127-152, USA 1988.

Horn et al., "Toward optimal structured light patterns", Proceedings of International Conference on Recent Advances in 3D Digital Imaging and Modeling, pp. 28-37, Ottawa, Canada, May 1997.

Mendlovic, et al., "Composite harmonic filters for scale, projection and shift invariant pattern recognition", Applied Optics, vol. 34, No. 2, pp. 310-316, Jan. 10, 1995.

Asada et al., "Determining Surface Orientation by Projecting a Stripe Pattern", IEEE Transactions on Pattern Analysis and Machine Intelligence, vol. 10, No. 5, year 1988.

Winkelbach et al., "Shape from Single Stripe Pattern Illumination", Luc Van Gool (Editor), (DAGM 2002) Patter Recognition, Lecture Notes in Computer Science 2449, p. 240-247, Springer 2002.

Koninckx et al., "Efficient, Active 3D Acquisition, based on a Pattern-Specific Snake", Luc Van Gool (Editor), (DAGM 2002) Pattern Recognition, Lecture Notes in Computer Science 2449, pp. 557-565, Springer 2002.

Kimmel et al., Analyzing and synthesizing images by evolving curves with the Osher-Sethian method, International Journal of Computer Vision, 24(1), pp. 37-56 , year 1997.

Zigelman et al., "Texture mapping using surface flattening via multi-dimensional scaling", IEEE Transactions on Visualization and Computer Graphics, 8 (2), pp. 198-207, year 2002.

Dainty, J.C., "Introduction", Laser Speckle and Related Phenomena, pp. 1-7, Springer-Verlag, Berlin Heidelberg, 1975.

Ypsilos et al., "Video-rate capture of Dynamic Face Shape and Appearance", Sixth IEEE International Conference on Automatic Face and Gesture Recognition (FGR 2004), Seoul, Korea, May 17-19, 2004.

Abramson, N., "Holographic Contouring by Translation", Applied Optics Journal, vol. 15, No. 4, pp. 1018-1976, Apr. 1976.

Achan et al., "Phase Unwrapping by Minimizing Kikuchi Free Energy", IEEE International Geoscience and Remote Sensing Symposium, pp. 1738-1740, Toronto, Canada, Jun. 2002.

Theocaris et al., "Radial Gratings as Moire Gauges", Journal of Scientific Instruments (Journal of Physics E), series 2, vol. 1, year 1968.

Ben Eliezer et al., "Experimental Realization of an Imaging System with an Extended Depth of Field", Applied Optics Journal, vol. 44, No. 14, pp. 2792-2798, May 10, 2005.

Tay et al., "Grating Projection System for Surface Contour Measurement", Applied Optics Journal, vol. 44, No. 8, pp. 1393-1400, Mar. 10, 2005.

Brooks et al., "Moire Gauging Using Optical Interference Patterns", Applied Optics Journal, vol. 8, No. 5, pp. 935-940, May 1969.

Hovanesian et al., "Moire Contour-Sum Contour-Difference, and Vibration Analysis of Arbitrary Objects", Applied Optics Journal, vol. 10, No. 12, pp. 2734-2738, Dec. 1971.

Bryngdahl, O., "Characteristics of Superposed Patterns in Optics", Journal of Optical Society of America, vol. 66, No. 2, pp. 87-94, Feb. 1976.

Cohen et al., "High-Resolution X-ray Diffraction for Characterization and Monitoring of Silicon-On-Insulator Fabrication Processes", Applied Physics Journal, vol. 93, No. 1, pp. 245-250, Jan. 2003.

Chen et al., "Overview of Three-Dimensional Shape Measurement Using Optical Methods", Society of Photo-Optical Instrumentation Engineers Journal 39(1), pp. 10-22, Jan. 2000.

Takasaki, H., "Moire Topography", Applied Optics Journal, vol. 12, No. 4, pp. 845-850, Apr. 1973.

Takasaki, H., "Moire Topography", Applied Optics Journal, vol. 9, No. 6, pp. 1467-1472, Jun. 1970.

Hildebrand et al., "Multiple-Wavelength and Multiple-Source Holography Applied to Contour Generation", Journal of Optical Society of America Journal, vol. 57, No. 2, pp. 155-162, Feb. 1967.

Su et al., "Application of Modulation Measurement Profilometry to Objects with Surface Holes", Applied Optics Journal, vol. 38, No. 7, pp. 1153-1158, Mar. 1, 1999.

Lim et al., "Additive Type Moire with Computer Image Processing", Applied Optics Journal, vol. 28, No. 13, pp. 2677-2680, Jul. 1, 1989.

Hung et al., "Time-Averaged Shadow-Moire Method for Studying Vibrations", Applied Optics Journal, vol. 16, No. 6, pp. 1717-1719, Jun. 1977.

Idesawa et al., "Scanning Moire Method and Automatic Measurement of 3-D Shapes", Applied Optics Journal, vol. 16, No. 8, pp. 2152-2162, Aug. 1977.

Iizuka, K., "Divergence-Ratio Axi-Vision Camera (Divcam): A Distance Mapping Camera", Review of Scientific Instruments 77, 0451111 (2006).

Shpunt et al., U.S. Appl. No. 61/229,754 "Pattern-Based Depth Mapping with Stereoscopic Assistance" filed Jul. 30, 2009.

Luxtera Inc., "Luxtera Announces World's First 10GBit CMOS Photonics Platform", Carlsbad, USA, Mar. 28, 2005 (press release).

Post et al., "Moire Methods for Engineering and Science—Moire Interferometry and Shadow Moire", Photomechanics (Topics in Applied Physics), vol. 77, pp. 151-196, Springer Berlin / Heidelberg, Jan. 1, 2000.

Piestun et al., "Wave Fields in Three Dimensions: Analysis and Synthesis", Journal of the Optical Society of America, vol. 13, No. 9, pp. 1837-1848, Sep. 1996.

Lee et al., "Variable Pulse Mode Driving IR Source Based 3D Robotic Camera", MVA2005 IAPR Conference on Machine Vision Applications, pp. 530-533, Japan, May 16-18, 2005.

Mordohai et al., "Tensor Voting: A Perceptual Organization Approach to Computer Vision and Machine Learning", Synthesis Lectures on Image, Video and Multimedia Processing, issue No. 8, Publishers Morgan and Claypool, year 2006.

Beraldin et al., "Active 3D Sensing", Scuola Normale Superiore PISA, vol. 10, pp. 22-46, Apr. 2000.

Bhat et al., "Ordinal Measures for Image Correspondence", IEEE Transactions on Pattern Analysis and Machine Intelligence, vol. 20, No. 4, pp. 415-423, Apr. 1998.

Bradley et al., "Synchronization and Rolling Shutter Compensation for Consumer Video Camera Arrays", IEEE International Workshop on Projector-Camera Systems—PROCAMS 2009 (Miami Beach, Florida, 2009).

De Piero et al., "3D Computer Vision Using Structured Light: Design Calibration and Implementation Issues", Advances in Computers, vol. 43, pp. 243-278, Academic Press 1996.

Hongjun et al., "Shape Measurement by Digital Speckle Temporal Sequence Correlation Method", Acta Optica Sinica Journal, vol. 21, No. 10, pp. 1208-1213, Oct. 2001.

Hongjun, D., "Digital Speckle Temporal Sequence Correlation Method and the Application in Three-Dimensional Shape Measurement", Chinese Doctoral Dissertations & Master's Theses, Full-text Database (Master) Basic Sciences, No. 1, Mar. 15, 2004.

Hsueh et al., "Real-time 3D Topography by Speckle Image Correlation", Proceedings of SPIE Conference on Input/Output and Imaging Technologies, vol. 3422, pp. 108-112, Taiwan, Jul. 1998.

Chinese Patent Application # 200780009053.8 Official Action dated Apr. 15, 2010 (with English translation).

Chinese Patent Application # 200680038004.2 Official Action dated Mar. 30, 2010 (with English translation).

Zhu et al., "Fusion of Time-of-Flight Depth and Stereo for High Accuracy Depth Maps", Proceedings of the IEEE Conference on Computer Vision and Pattern Recognition, Anchorage, USA, Jun. 24-26, 2008.

EZconn Czech A.S., "Site Presentation", Oct. 2009.

Shpunt et al., U.S. Appl. No. 12/707,678 "Reference Image Techniques for 3D sensing" filed Feb. 18, 2010.

Sali et al., U.S. Appl. No. 12/758,047 "Three-Dimensional Mapping and Imaging" filed Apr. 12, 2010.

Cohen et al., U.S. Appl. No. 12/605,340 "Geometrical Calibration and Correction for Depth Sensor" filed Oct. 25, 2009.

Petronius et al., U.S. Appl. No. 61/300,465 "Integrated Photonics Module for Optical Projection" filed Feb. 2, 2010.

Mor et al., U.S. Appl. No. 12/762,373 "Synchronization of Projected Illumination with Rolling Shutter of Image Sensor" filed Apr. 19, 2010.
Engfield, N., "Use of Pseudorandom Encoded Grid in U.S. Appl. No. 11/899,542", Andrews Robichaud, Jun. 22, 2011.
U.S. Appl. No. 61/471,215, filed Apr. 4, 2011.
Chinese Patent Application # 200680038004.2 Official Action dated Aug. 3, 2011 (English translation).
International Application PCT/IB2011/053560 filed on Aug. 10, 2011.
U.S. Appl. No. 61/419,891, filed Dec. 6, 2010.
U.S. Appl. No. 61/415,352, filed Nov. 19, 2010.
Japanese Patent Application # 2011-517308 Official Action dated Dec. 5, 2012.
U.S. Appl. No. 12/844,864 Official Action dated Dec 6, 2012.
U.S. Appl. No. 12/758,047 Official Action dated Oct 25, 2012.
U.S. Appl. No. 13/036,023 Official Action dated Jan. 7, 2013.
U.S. Appl. No. 13/541,775, filed Jul. 5, 2012.
U.S. Appl. No. 12/282,517 Official Action dated Jun. 12, 2012.
U.S. Appl. No. 12/522,172 Official Action dated Jun. 29, 2012.
JP Patent Application # 2008558984 Office Action dated Jul. 3, 2012.
U.S. Appl. No. 12/522,176 Official Action dated Aug. 2, 2012.
Korean Patent Application # 10-2008-7025030 Office Action dated Feb. 25, 2013.
U.S. Appl. No. 12/707,678 Office Action dated Feb. 26, 2013.
U.S. Appl. No. 12/758,047 Office Action dated Apr. 25, 2013.
U.S. Appl. No. 12/844,864 Office Action dated Apr. 11, 2013.

* cited by examiner

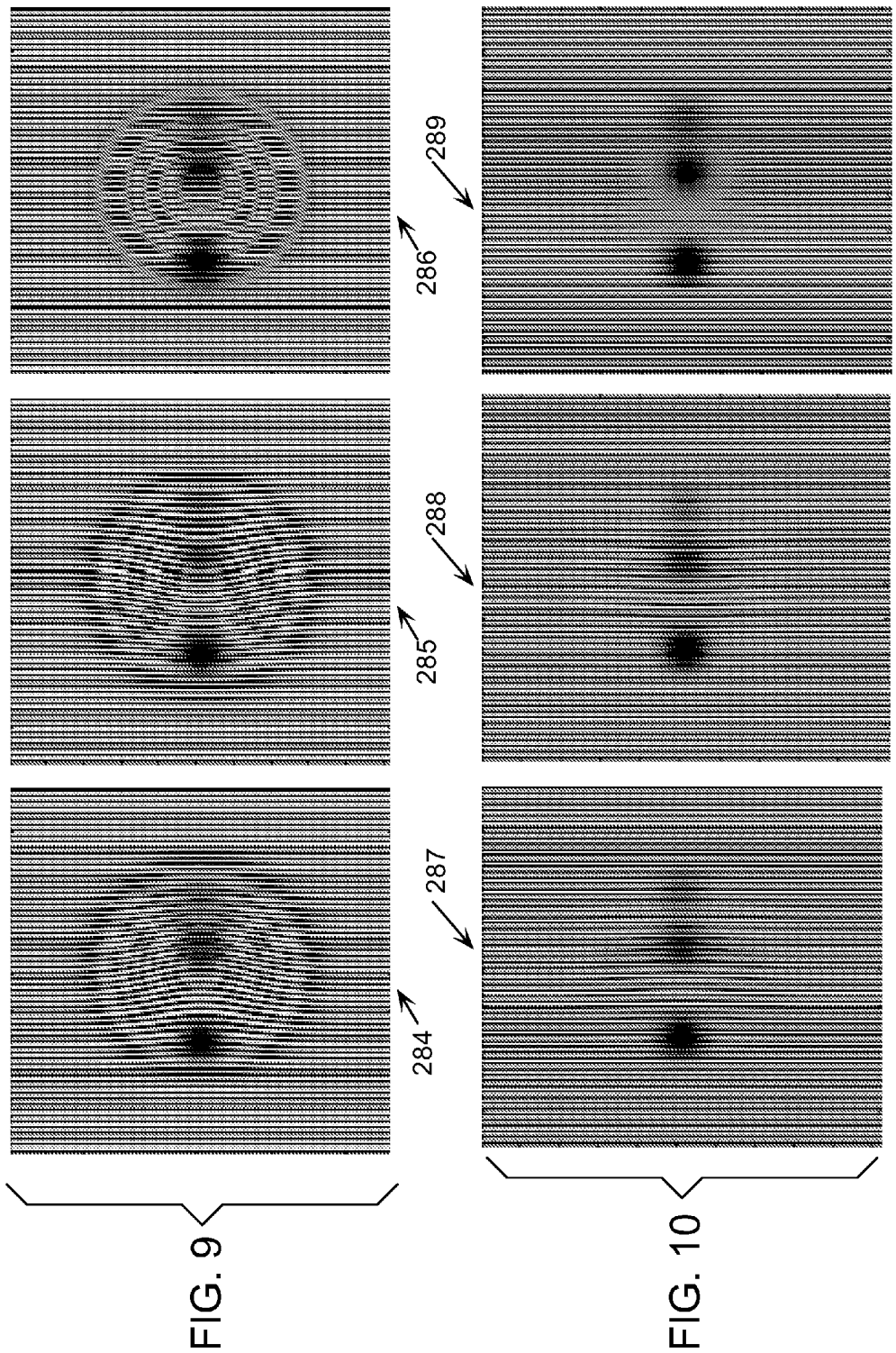

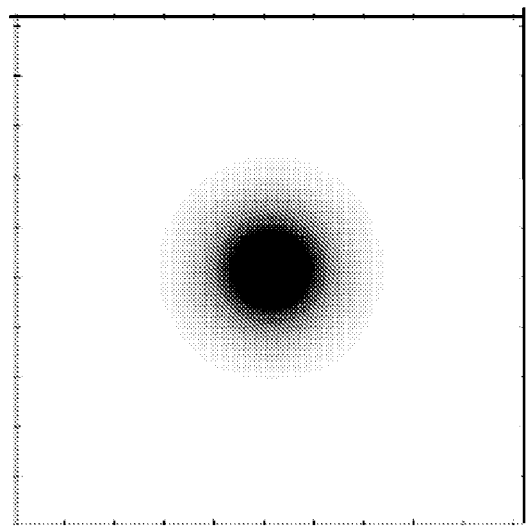
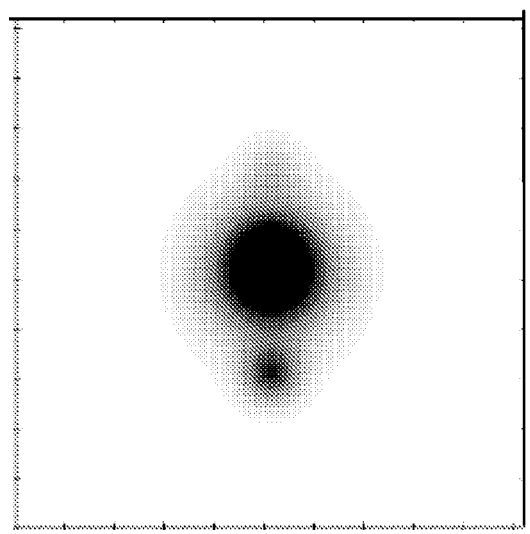
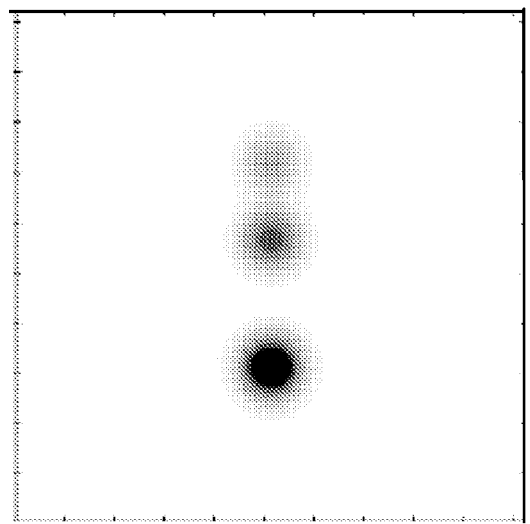
FIG. 11

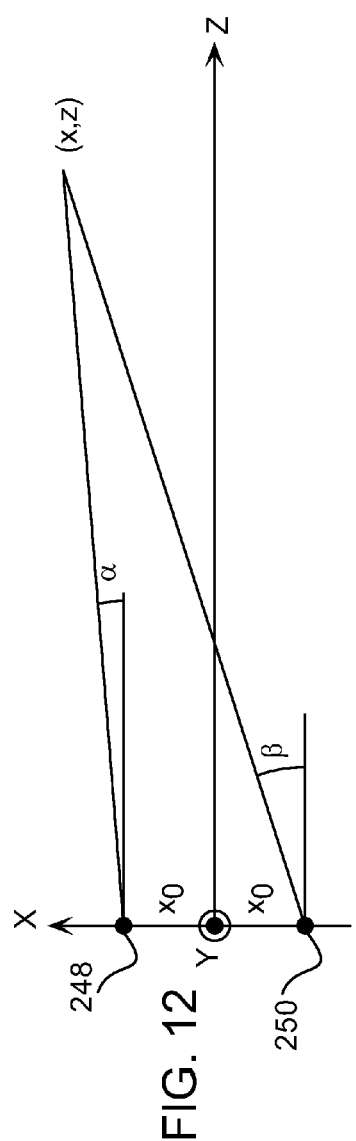
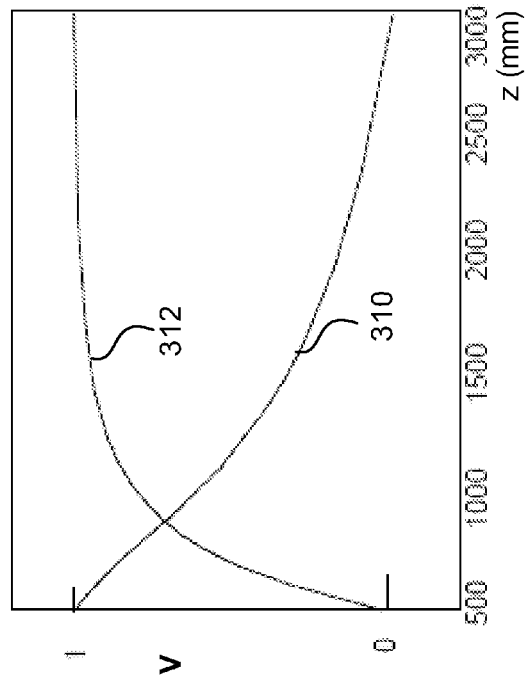
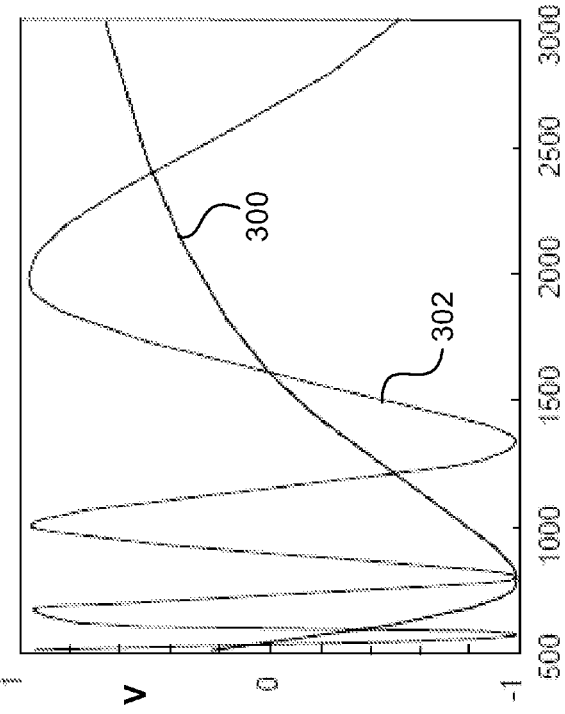
FIG. 12
FIG. 13
FIG. 14

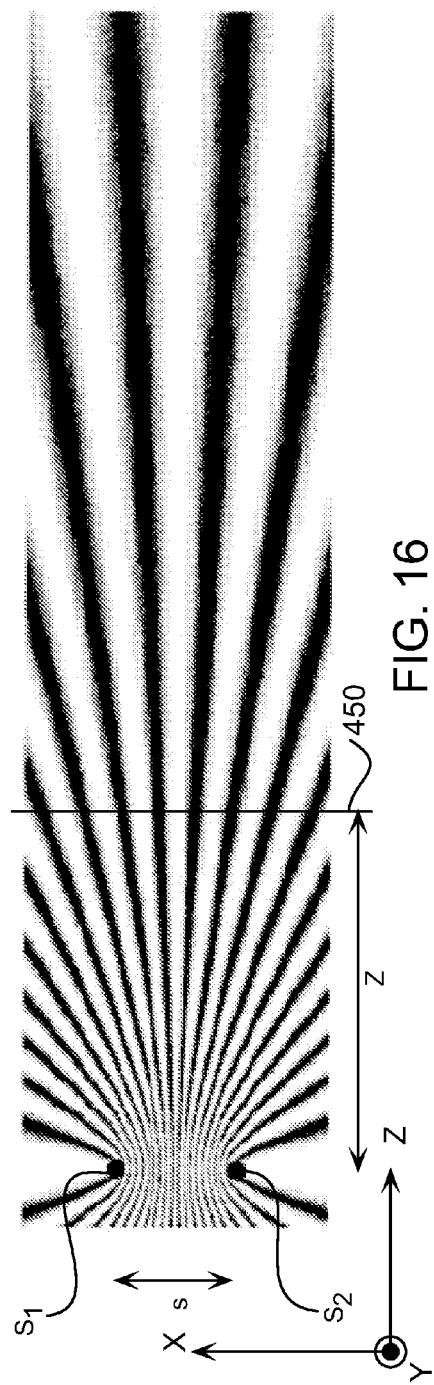
FIG. 16
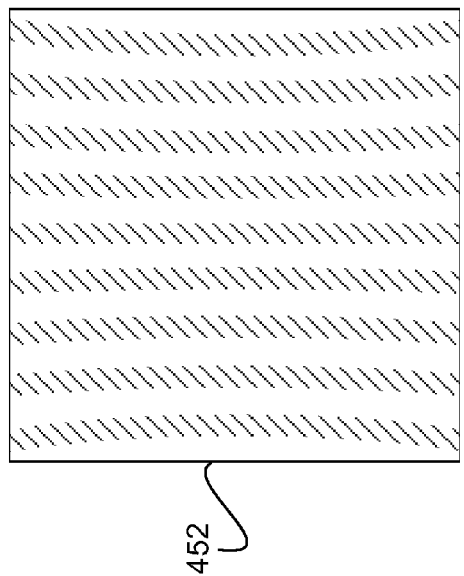
FIG. 17

DEPTH RANGING WITH MOIRÉ PATTERNS

CROSS-REFERENCE TO RELATED APPLICATION

This application claims the benefit of U.S. Provisional Patent Application 61/151,853, filed Feb. 12, 2009, which is incorporated herein by reference.

FIELD OF THE INVENTION

The present invention relates generally to mapping of an object in three dimensions, and specifically to performing the mapping using Moiré patterns.

BACKGROUND OF THE INVENTION

A Moiré pattern is formed when a first high frequency set of fringes is demodulated by means of a second high frequency set of fringes, the two frequencies having the same or similar values. The Moiré pattern is the low frequency pattern that results from the demodulation.

Moiré patterns may be classified as multiplicative or additive. A multiplicative Moiré pattern occurs when a function representing the pattern is formed as a product of two functions representing the fringes. An additive Moiré pattern is formed when a function representing the pattern is formed as a sum of two functions representing the fringes.

The prior art use of Moiré patterns for three-dimensional mapping of objects is based on contouring and thus is inherently plagued with ambiguity problems. An article entitled "Overview of three dimensional shape measurement using optical methods," by F. Chen, et al., published in Optical Engineering Vol. 39, pages 10-22 (2000), features an overview of the use of Moiré patterns for three dimensional (3D) mapping. The article is incorporated herein by reference.

The description above is presented as a general overview of related art in this field and should not be construed as an admission that any of the information it contains constitutes prior art against the present patent application.

SUMMARY OF THE INVENTION

An embodiment of the present invention provides a method for three-dimensional mapping of an object, including:

projecting with a projector a set of fringes on the object;

capturing an image of the object in a camera;

processing the captured image so as to detect a Moiré pattern associated with the object and so as to extract depth information from the Moiré pattern; and configuring the projector and the camera so that a locally unambiguous characteristic of the Moiré pattern is related to a depth of the object.

Typically, the set of fringes includes a single set of fringes diverging from an aperture of the projector. Processing the captured image may include multiplying the captured image with a reference grating to form a composite image including the Moiré pattern. Alternatively, processing the captured image includes multiplying the captured image with a digital representation of a reference grating to form a composite image including the Moiré pattern.

Processing the captured image may include identifying and removing a reflectivity component of the object in the captured image. Typically, the set of fringes have a spatial frequency, and identifying and removing the reflectivity component includes filtering a composite image derived from the captured image around a frequency corresponding to twice the spatial frequency.

In a disclosed embodiment the set of fringes have a spatial frequency, and detecting the Moiré pattern includes filtering a composite image derived from the captured image in a low pass filter blocking frequencies greater than and including a frequency corresponding to the spatial frequency.

In a further disclosed embodiment the set of fringes have a spatial period at the object, and configuring the projector and the camera includes configuring an effective displacement of the fringes to be less than the spatial period.

In a yet further disclosed embodiment projecting the set of fringes includes projecting the set of fringes via a beamsplitter, and capturing the image includes capturing radiation from the object via the beamsplitter, and detecting the Moiré pattern includes orienting the beamsplitter to form the Moiré pattern.

The set of fringes may include a first set of fringes and a second set of fringes configured to generate the Moiré pattern. The set of fringes may have a spatial frequency, and processing the captured image may include identifying and removing a reflectivity component by filtering a composite image derived from the captured image at a frequency corresponding to the spatial frequency.

Typically, the locally unambiguous characteristic is a visibility of the Moiré pattern.

Alternatively, the locally unambiguous characteristic is a function of an intensity of the Moiré pattern. The function may be the intensity.

Typically, the locally unambiguous characteristic varies monotonically with locations on the object.

Alternatively, the locally unambiguous characteristic varies non-monotonically with locations on the object.

In an alternative embodiment projecting the set of fringes includes configuring the projector to use Young's method to generate the set of fringes.

In a further alternative embodiment the projector includes a single projection lens having two numerical apertures with a separation therebetween selected to provide the fringes with a given spatial frequency and a given visibility variation with distance.

In a yet further alternative embodiment the projector includes a cylindrical lens array.

There is also provided, according to an embodiment of the present invention, apparatus for three-dimensional mapping of an object, including:

a projector which is configured to project a single set of fringes on the object;

a camera which is configured to capture an image of the object; and a processor which is configured to process the captured image so as to detect a Moiré pattern associated with the object and so as to extract depth information from the Moiré pattern, wherein the projector and the camera are configured so that a locally unambiguous characteristic of the Moiré pattern is related to a depth of the object.

The apparatus may include a reference grating located at an image plane of the camera, and processing the captured image may include multiplying the captured image with the reference grating to form a composite image including the Moiré pattern.

Typically, processing the captured image includes multiplying the captured image with a digital representation of a reference grating to form a composite image including the Moiré pattern.

In one embodiment the single set of fringes have a frequency of repetition, and the apparatus includes identifying and removing a reflectivity component of the object in the captured image by filtering a composite image derived from the captured image at a frequency corresponding to twice the frequency of repetition.

Typically, the single set of fringes have a spatial frequency, and detecting the Moiré pattern includes filtering a composite image derived from the captured image in a low pass filter blocking frequencies greater than and including a frequency corresponding to the spatial frequency.

In a disclosed embodiment the single set of fringes have a spatial period at the object, and configuring the projector and the camera includes configuring an effective displacement of the fringes to be less than the spatial period.

In a further disclosed embodiment the apparatus includes a beamsplitter, and projecting the single set of fringes includes projecting the fringes via the beamsplitter, and capturing the image includes capturing radiation from the object via the beamsplitter, and detecting the Moiré pattern includes orienting the beamsplitter to form the Moiré pattern.

There is further provided, according to an embodiment of the present invention, apparatus for three-dimensional mapping of an object, including:

a projector which is configured to project a first set of fringes and a second set of fringes on the object;

a camera which is configured to capture an image of the object; and a processor which is configured to process the captured image so as to detect a Moiré pattern associated with the object and so as to extract depth information from the Moiré pattern, wherein the projector and the camera are configured so that a locally unambiguous characteristic of the Moiré pattern is related to a depth of the object.

Typically the first set of fringes and the second set of fringes are configured to generate the Moiré pattern.

In one embodiment the first and second sets of fringes have a spatial frequency, and processing the captured image includes identifying and removing a reflectivity component by filtering a composite image derived from the captured image at a frequency corresponding to the spatial frequency.

The present invention will be more fully understood from the following detailed description of the embodiments thereof, taken together with the drawings in which:

BRIEF DESCRIPTION OF THE DRAWINGS

FIGS. 9 and 10 are schematic diagrams of the projections of sets of fringes, according to respective embodiments of the present invention;

FIG. 11 shows schematic diagrams illustrating factors used in equations, according to an embodiment of the present invention;

FIG. 12 is a schematic diagram used in accounting for changes of fringe visibility with changes of a parameter z, according to an alternative embodiment of the present invention;

FIG. 13 shows graphs of a visibility V vs. parameter z, according to an embodiment of the present invention;

FIG. 14 shows further graphs of visibility V vs. parameter z, according to an embodiment of the present invention;

FIG. 16 and FIG. 17 are schematic diagrams illustrating formation of fringes using Young's method, according to an embodiment of the present invention.

DETAILED DESCRIPTION OF EMBODIMENTS

Overview

Figure 1:
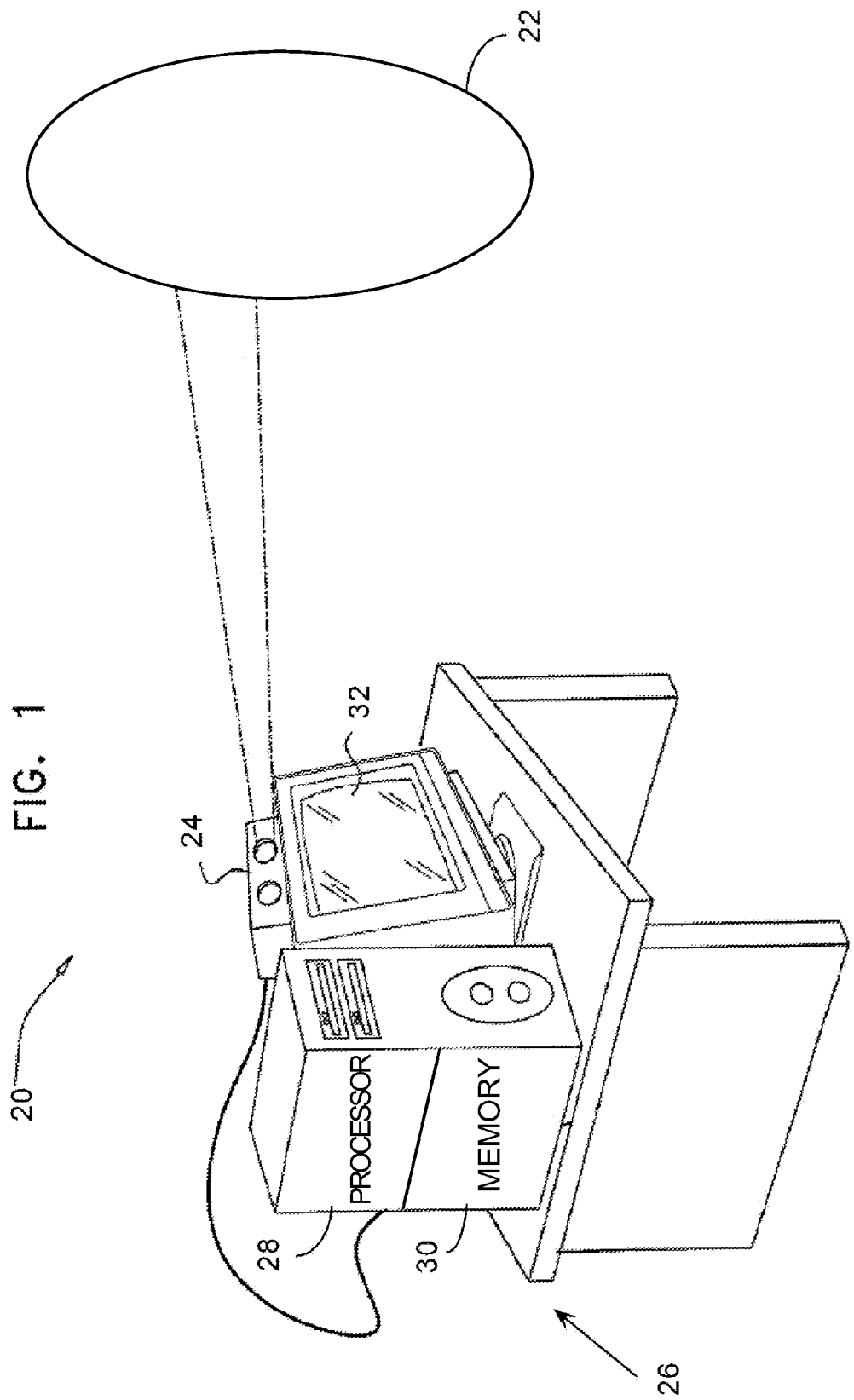
FIG. 1 is a schematic diagram illustrating a mapping facility for three-dimensional (3D) mapping of an object, according to an embodiment of the present invention.

Embodiments of the present invention use Moiré patterns to perform three-dimensional (3D) mapping of an object. The embodiments use a locally unambiguous characteristic of the Moiré pattern generated by the object, such as a local function of the intensity, to measure depths of the object at varying locations on the object.

In a multiplicative Moiré embodiment, a fringe projector projects a single set of fringes onto the object. A camera captures an image of the object, and the captured image is multiplied with a reference grating, corresponding to the projected set of fringes, to form a composite image which includes the Moiré pattern. Alternatively, the captured image is multiplied with a digital representation of the reference grating to form the composite image. The Moiré pattern is recovered from the composite image, and may be analyzed to remove a reflectivity component that is typically generated by the object. The intensity of the remaining component of the pattern is related to a local depth of the object. The fringe projector and camera may be configured so that the intensity is monotonically related to the depth.

In an additive Moiré embodiment, a fringe projector projects two sets of fringes onto the object. A camera captures an image of the object, and a Moiré pattern is recovered from the image. The Moiré pattern may be analyzed to remove a reflectivity component, and to recover the intensity of the remaining component of the pattern. As for the multiplicative embodiment, the intensity is related to a local depth of the object. In addition a visibility of the fringes is also related to the local depth, so that measurements of the visibility may be used to infer the depth. (Visibility is defined in equation (17) of the Detailed Description.) In the additive embodiment, values of parameters of the embodiment, such as a separation of the sets of fringes, may be selected so that the intensity and the visibility are each monotonically related to the depth. In the additive embodiment, the Moiré pattern is developed on the object itself. Thus, in contrast to the multiplicative embodiment where the pattern is developed in the camera, in the additive embodiment there is no limitation on parameters of the camera such as its position.

Embodiments of the present invention use a local intensity characteristic, such as fringe visibility, to determine depth. This is in complete contrast to contouring methods which attempt to trace and then use the positions of the fringes.

By configuring the intensity and/or the visibility to be monotonically related to the object depth, both embodiments may provide a single unambiguous value for the depth. Furthermore, parameters of both embodiments may be selected to cover different ranges of depths, while still providing unambiguous values for the depths.

Alternatively, in some embodiments, some ambiguity may be tolerated, for example, to gain depth resolution. In these embodiments techniques such as phase unwrapping may be used to recover unambiguous depth values.

As is apparent from the following Detailed Description, in embodiments of the present invention there is no need to trace and/or count fringes, as is required by prior art systems.

DETAILED DESCRIPTION

FIG. 1 is a schematic diagram illustrating a mapping facility 20 for three-dimensional (3D) mapping of an object 22, according to an embodiment of the present invention. Facility 20 comprises a combined projection and imaging system 24, which is described in more detail below. System 24 is operated by a processing unit 26, which also analyzes the images generated in the system.

Processing unit 26 may be a stand-alone computer, or may be incorporated into system 24. Unit 26 comprises a processor 28, which typically operates using software stored in a memory 30 of the unit. Alternatively, at least some of the software used by the processor may be implemented as hardware, for example in a field programmable gate array (FPGA) or as an application specific integrated circuit (ASIC). Memory 30 typically comprises both non-volatile and volatile components. The software used by processor 28 may be downloaded to processing unit 26 in electronic form, over a network, for example, or it may alternatively be supplied to the processing unit on tangible media, such as a CD-ROM. The results formed by processing unit 26, comprising a 3D mapping of object 22, may be presented to an operator of facility 20 on a graphic unit interface 32 of the unit. Alternatively, processing unit 26 may provide its results in any other suitable form, for example, via a bus to a gaming device using the 3D mapping.

Figure 2:
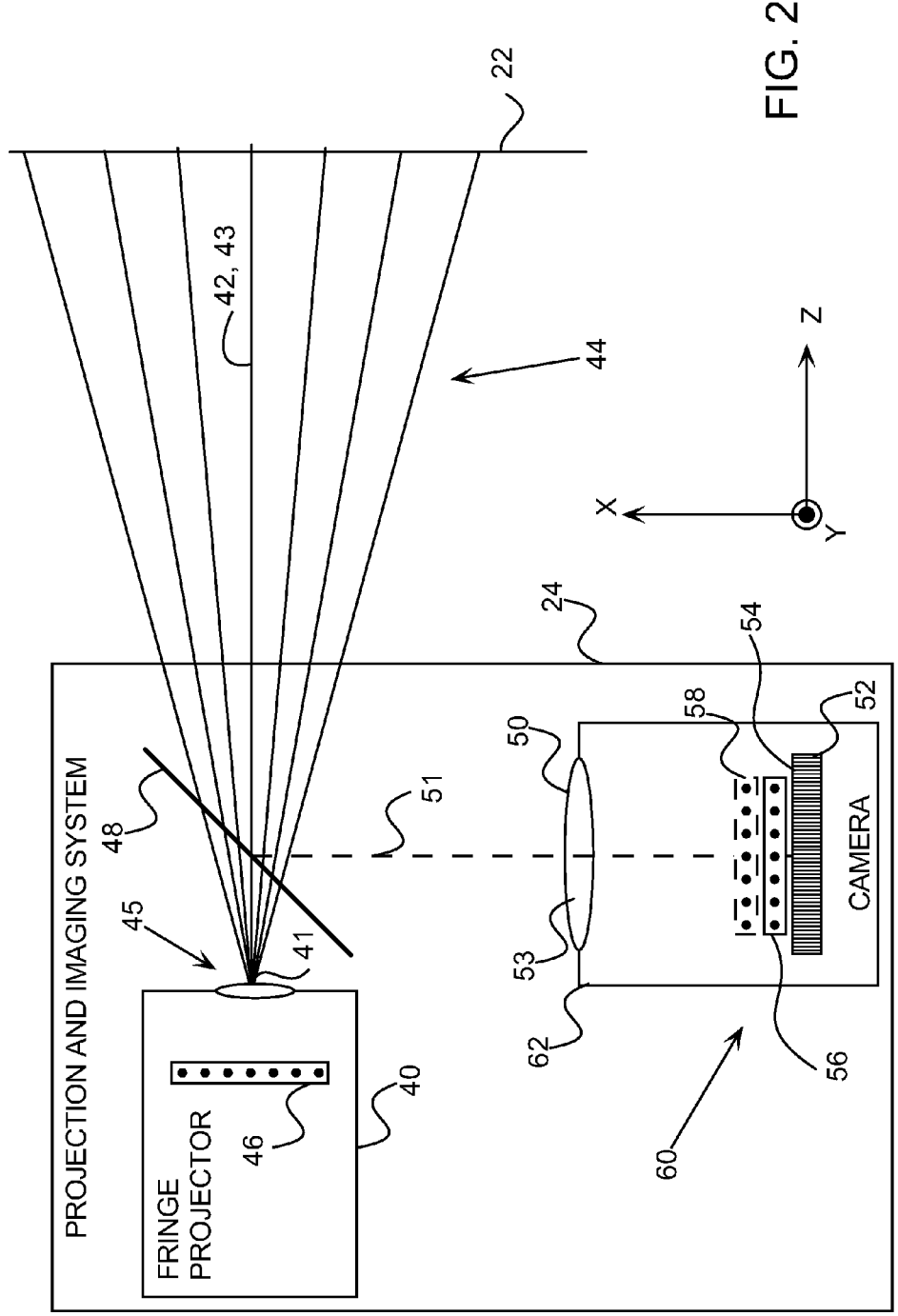
FIG. 2 is a schematic block diagram of a projection and imaging system, according to an embodiment of the present invention.
Figure 4:
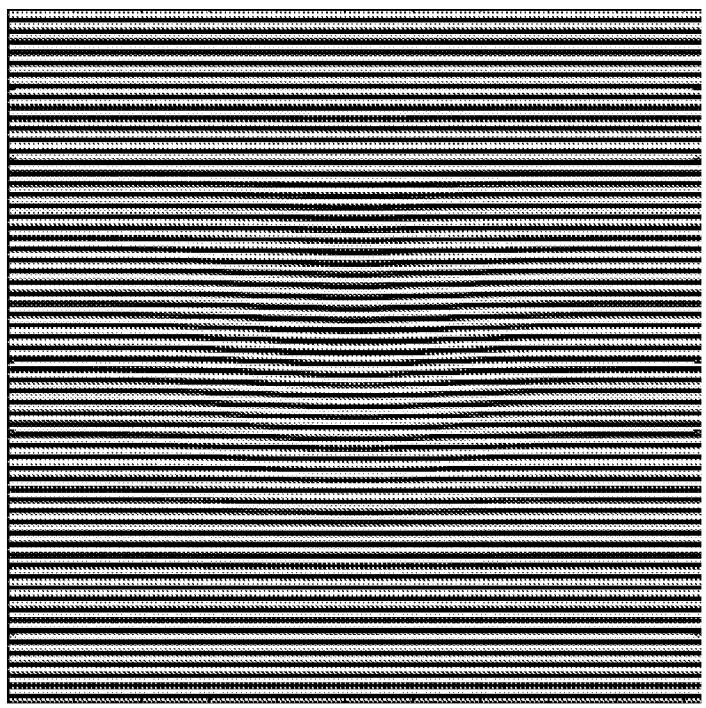
FIG. 4 is a schematic diagram of a captured image of the system of FIG. 2, according to an embodiment of the present invention.
Figure 3:
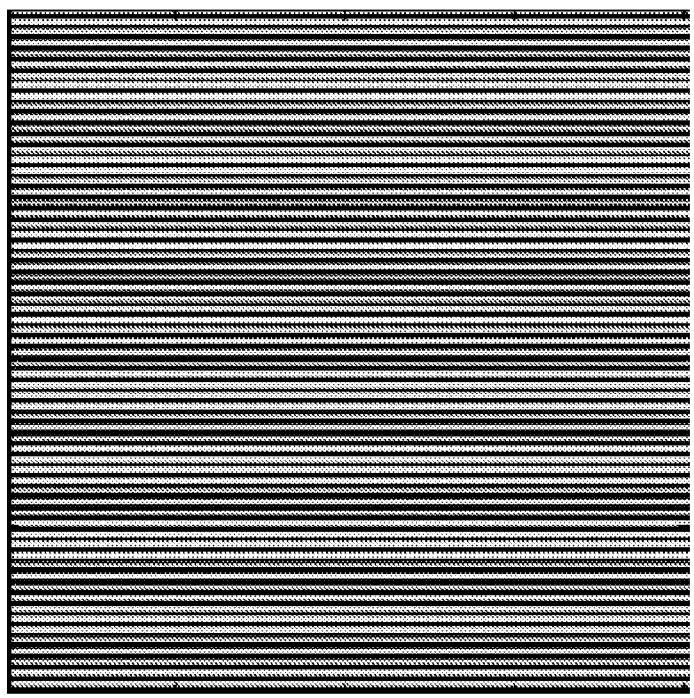
FIG. 3 is a schematic diagram of a reference grating of the system of FIG. 2, according to an embodiment of the present invention.

FIG. 2 is a schematic block diagram of projection and imaging system 24, FIG. 3 is a schematic diagram of a reference grating 46 of the system, and FIG. 4 is a schematic diagram of a captured image 56 of the system, according to respective embodiments of the present invention. As is described below, system 24 generates a multiplicative Moiré pattern. In the following description of system 24, for clarity the system is assumed to be implemented with respect to a set of xyz orthogonal axes, where the x-axis and the z-axis are in the plane of the paper. However, it will be understood that system 24, as well as facility 20, may operate in substantially any orientation. System 24 comprises a fringe projector 40, which has an axis of projection 42 parallel to the z-axis. Projector 40 is configured to project a set of fringes 44 distributed symmetrically about an axis 43, so that axes 42 and 43 are substantially congruent. The fringes are assumed to diverge from a point 41 located in an optical aperture 45 of the projector. Except where otherwise stated, and ignoring distortions that may be introduced by the projection or capturing systems themselves, in the following description the fringes projected by the projector are assumed to have the following properties:

The fringes are substantially invariant with respect to changes in value of y.

For any given value of z, the intensity of the fringes as measured in the x direction varies periodically between a maximum intensity $I_{max}$ and a minimum intensity $I_{min}$. Typically, the intensity of the fringes varies sinusoidally with x.

By way of example, in the following description it is assumed that projector 40 projects a grating 46, herein termed a projection grating, to form fringes 44. Such a method of forming the fringes, as well as other methods that may be implemented by projector 40 in generating the fringes, is described below, in the section of the description titled "Generation of Fringes."

While for simplicity in the description herein the fringes produced by projector 40 are assumed to be formed from electromagnetic (EM) radiation having a wavelength in the visible spectrum, this is not a necessary limitation of embodiments of the present invention. Thus the fringes may be formed from infra-red or ultraviolet radiation, or any other suitable wavelength of EM radiation. Moreover, the fringes may be formed by other types of radiation, such as sound waves at ultrasonic frequencies, and information from these fringes may be captured with an appropriately configured detector. For simplicity, the following description assumes EM radiation, and those having ordinary skill in the art will be able to adapt the description, mutatis mutandis, for other types of radiation.

System 24 comprises a beamsplitter 48, typically a 50%/50% beamsplitter, although in some embodiments another ratio for the beamsplitter may be used. An optimum value of the ratio may be determined by one of ordinary skill in the art, without undue experimentation. Beamsplitter 48 may be formed from a sheet of transparent material, or alternatively the beamsplitter may be in the form of a cube.

The fringes from projector 40, after passage through beamsplitter 48, strike object 22. Resulting reflected radiation from object 22 is reflected by the beamsplitter to a camera 62.

Camera 62 comprises imaging optics 50, which focus the reflected radiation onto a surface 54 of a detector array 52, typically a charge coupled device (CCD) or a complementary metal-oxide semiconductor (CMOS) array, which in turn captures the image. Processor 28 scans array 52 to output a signal corresponding to the captured image. The camera has an optical axis 51, and beamsplitter 48 is aligned so that axes 51 and 43 approximately reflect into each other. Camera 62 is typically located so that an optical aperture 53 of the camera and optical aperture 45 of the projector are equidistant from the beamsplitter. The focused image is typically a partially distorted image of the reference grating, the partial distortion being caused by, inter alia, changes in the value of z for different points (x,y) on object 22. The focused image is herein also referred to as a captured image 56.

In a disclosed embodiment, herein also referred to as a physical embodiment, a physical replica 58 of projection grating 46 is positioned on surface 54. The replica is geometrically similar to grating 46, and the size of the replica is set to correspond to the size of captured image 56. Replica 58 is used as a reference, and is also referred to herein as reference grating 58. In the disclosed embodiment, a multiplicative composite image 60 is formed optically on surface 54 by the multiplication of captured image 56 with reference grating 58.

In an alternative embodiment, herein also referred to as a digital embodiment, no replica 58 is positioned on surface 54, so that the image formed by detector array 52 corresponds to the captured image. In the alternative embodiment, composite image 60 is formed digitally, by multiplying a digital representation of reference grating 58 with captured image 56.

In order that composite image 60 forms a measureable Moiré pattern, the reference grating and the captured image are configured to make a small angle θ with each other. Angle θ is illustrated in an exaggerated form in FIGS. 3 and 4, where FIG. 3 shows the reference grating aligned with the x and y axes, and FIG. 4 shows the captured image forming angle θ with the axes. Methods of configuring small angle θ are described below.

The following analysis of the gratings assumes, by way of example, that the fringes formed by projector 40 on object 22 have a substantially sinusoidal intensity profile.

The analysis herein also assumes that the geometry of the projector 40 and camera 62, which acts as an image capturing system, is configured such that the points of object 22 are at essentially equal distance from the projection aperture of projector 40 and the input aperture of camera 62. This renders the spatial frequency of fringes, as captured by array 52, essentially constant with z, since the camera field of view expands with z at essentially the same rate as the projected fringe pattern. In addition, except where otherwise stated, the analysis assumes that references to x and y coordinates are mapped to camera 62 perceived coordinates, and that the projection geometry ensures that these coordinates also correspond to the projector coordinates.

An equation (1) representing the intensity of reference grating 46 at object 22, as would be captured by camera 62 if the object was flat (choosing the phase of the grating arbitrarily) is:

$$g_1(x,y) = I_1(1 + \cos(kx)) \quad (1)$$

where $I_1$ is a constant of proportionality determined by the intensity of fringes 44 and the geometry of system 24, and k is a spatial frequency of the fringes as captured by camera 62; herein it is assumed that $$k = \frac{2\pi}{p},$$

where p is a spatial period of the fringes along the x axis, as measured in pixels of array 52.

Configuration of the system, as described hereinabove, ensures that the period p of the fringes, as captured by camera 62, does not vary with z.

When the measured object 22 deviates from being flat, an equation (2) representing the intensity of captured image 56 at surface 54 is:

$$g_2(x, y) = I_2(1 + \cos(kx + ah(x, y))) \quad (2)$$
$$= I_2\left(1 + \cos\left(k\left(x + \frac{ah(x, y)}{k}\right)\right)\right)$$

where $I_2$ is a constant of proportionality, determined in a similar manner to $I_1$, k is the spatial frequency the fringes, as defined for equation (1), h is a local distance of object 22, measured parallel to the z-axis relative to an imaginary flat object at given distance, and a is a constant determined by the geometry of the elements of system 24.

The term $$\frac{ah(x, y)}{k}$$

in equation (2) is an effective perceived displacement or variation, parallel to the x-axis (in pixel coordinates) of the fringes at a point (x,y), due to the value of h at the point. In the analysis herein, except where otherwise stated, it is assumed that for object 22, the following relation for the variation term $$\frac{ah(x, y)}{k}$$

holds:

$$\frac{ah(x, y)}{k} < p \quad (3)$$

where p is the spatial period of the fringes, defined above with respect to equation (1).

It will be understood that relation (3) describes a variation of $$\frac{ah(x, y)}{k}$$

over object 22.

As is explained further below, embodiments of the present invention determine local distance h, or a depth of the object, by determining a local intensity and/or a visibility of the fringes (in contrast to prior art systems that attempt to trace the fringes themselves). If equation (3) holds, then the local intensity and the visibility vary monotonically with the depth. If the relation for the term $$\frac{ah(x, y)}{k}$$

given by equation (3) does not hold, then the variation of the intensity and/or of the visibility is non-monotonic and ambiguity in the determination of h may be introduced. The ambiguity can be removed by methods known in the art, such as phase unwrapping.

An equation (4) representing the intensity I of composite image 60 is:

$$I = R(x,y)g_1(x,y)g_2(x,y) \quad (4)$$

where R(x,y) is a local reflectivity of object 22 at a point (x,y) on the object as mapped onto array 52.

Substituting equations (1) and (2) into equation (4), and expanding gives:

$$I = R(x,y)I_1I_2(1 + \cos(kx) + \cos(kx+ah) + \cos(kx)\cos(kx+ah)) \quad (5)$$

Equation (5) may be rewritten as:

$$I = R(x, y)I_1 I_2 \left(1 + \cos(kx) + \cos(kx + ah) + \frac{1}{2}\cos(ah) + \frac{1}{2}\cos(2kx + ah)\right) \quad (6)$$

Inspection of equation (6) shows that the intensity I of composite image 60 has carrier terms with frequencies 0, k, and 2 k. Provided the highest spatial frequency corresponding to term $$\frac{ah(x, y)}{k}$$

is lower than the spatial frequency k, a low pass filter, applied to the output of array 52, will remove the carrier and higher frequencies, and yield a low pass filtered amplitude $A_0$:

$$A_0 = R_{\text{eff}}(x, y)\left(1 + \frac{1}{2}\cos(ah)\right) \quad (7)$$

where $R_{\text{eff}}(x,y) = R(x,y)I_1 I_2$ is an effective reflectivity of point (x,y).

Since equation (7) is derived using a low pass filter, the equation corresponds to the Moiré pattern generated in system 24. To determine h(x,y) from equation (7), it is necessary to evaluate $R_{\text{eff}}(x,y)$, which typically varies across object 22. Two methods for evaluating $R_{\text{eff}}(x,y)$ are described herein:

A first method computes local averages of the intensity of captured image 56, given by equation (2), for each (x,y) of object 22. The local average is typically computed over one period of the distorted grating. A normalization process is then applied, wherein a measure of $R_{\text{eff}}(x,y)$ for each specific point (x,y) is generated by dividing the value of $g_2(x,y)$ by the local average at point (x,y). This method may be applied to either the digital embodiment or the physical embodiment referred to above. In the case of the physical embodiment, camera 62 is configured to generate the intensities given by equation (2) by removing replica 58.

A second method uses the intensities given by equation (6), but as well as filtering the output of array 52 by a low pass filter, as described above, an amplitude of the frequencies corresponding to 2 k is determined. The following description explains the measurements derived from the analysis at frequencies of 2 k.

Expanding equation (6) in terms of complex exponents, and applying, for example, a digital band-pass filter around spatial frequency 2 k, we get:

$$A_2 = R_{\text{eff}}\left(\frac{1}{4}e^{iah}\right) \quad (8)$$

where $A_2$ is the frequency content (with phase) at spatial frequency 2 k.

Taking the absolute value of $4 A_2$, we obtain $R_{\text{eff}}$.

Thus, the reflectivity may be determined using a high pass filter on the output from array 52, or by sampling the intensity I at frequency 2 k.

From equations (7) and (8), an expression for $R_{\text{eff}}$ may be derived that is independent of ah.

Thus, using either of the methods explained above, $R_{\text{eff}}$ may be evaluated.

Returning to equation (7), the equation may be rewritten:

$$\cos(ah) = 2\left(\frac{A_0 - R_{\text{eff}}}{R_{\text{eff}}}\right) \quad (9)$$

Equation (9) may be further rewritten to give an equation for h:

$$h = \frac{1}{a}\arccos\left[2\left(\frac{A_0 - R_{\text{eff}}}{R_{\text{eff}}}\right)\right] \quad (10)$$

In equation (10) $A_0$ and $R_{\text{eff}}$ may be computed from equations (7) and (8) respectively. Since, from equation (3), $$\frac{ah(x, y)}{k} < p$$

in object 22, equation (10) gives a single value for h.

Figure 5:
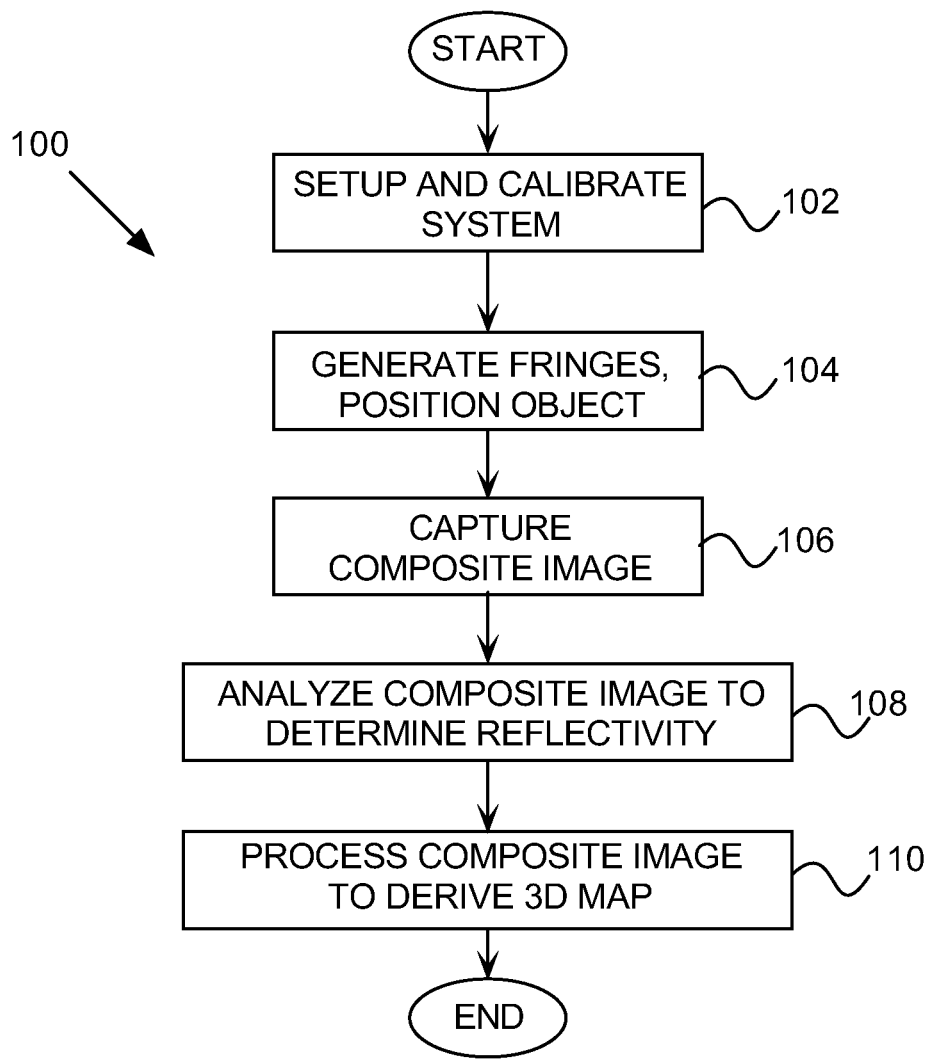
FIG. 5 is a flowchart showing steps performed in implementing the system of FIG. 2, according to an embodiment of the present invention.

FIG. 5 is a flowchart 100 showing steps performed in implementing system 24, according to an embodiment of the present invention.

In a setup and calibration step 102, an operator of system 24 positions a calibration object in the system and uses the object to adjust parameters of the system. The calibration object is typically similar in dimensions to object 22. In addition, the calibration object has a known topography, i.e., values of h(x,y) for the calibration object are known. By way of example the calibration object is assumed to have a known maximum value of h(x,y), $h_{max}(x,y)$.

After positioning the object in a suitable location with respect to the system, projector 40 is operated to generate fringes 44 on the calibration object. Camera 62 generates an initial composite image from an initial captured image and an initial reference grating. The initial reference grating is formed using one of the methods for generating reference gratings described above. Using the initial composite image, the operator adjusts the angle θ between the captured image and the reference grating to a small value, so that a measurable Moiré pattern is formed by array 52. The adjustment may advantageously be made by tilting beamsplitter 48. In addition, the operator may adjust an origin for h by shifting the relative overlap of the reference grating and the captured image.

Also in step 102, values of a, k, and p are set so that $$\frac{ah_{max}}{k} < p,$$

corresponding to equation (3). The values are typically pre-computed. The value of p, the spatial periodicity of the fringes, may be varied by adjusting parameters of projector 40, including a spacing of grating 46, if used. Typically, the parameters may also be pre-computed. As explained below, other methods for projecting fringes 44 also allow the value of p to be set.

The value of a is a function of the geometrical configuration of the optical elements of system 24, including camera 62, its imaging optics 50, and the characteristics of the optics. The value of a may be varied according to a focal length of the optics.

In an operational step 104, the operator positions object 22 so that it is illuminated by fringes 44.

In an image formation step 106, composite image 60 is formed, either physically on array 52 of camera 62, or by digital multiplication of captured image 56 with reference grating 58.

In a computation step 108, the composite image is analyzed to isolate the effective reflectivity $R_{eff}$ of each point (x,y) on object 22. The analysis uses one of the methods described above with reference to equations (7) and (8).

In a mapping step 110, processor 28 processes the composite image, containing the Moiré pattern, to calculate the values h(x,y) for every point (x,y), of object 22, using equation (10). The processing removes the effect on the Moiré pattern of the effective reflectivity $R_{eff}$, determined in step 108. The processing provides a single, unambiguous value of h(x,y) for every point (x,y). The processor outputs the results as described above with reference to FIG. 1.

It will be understood that equation (10) may be used regardless of whether the intensity varies monotonically or non-monotonically. As stated above, non-monotonic variation may introduce ambiguity in the determination of h. However, the number of ambiguous values of embodiments of the present invention may typically be two or three, which is orders of magnitude less than the number of ambiguous values of prior art systems. Thus, ambiguities of embodiments of the present invention may be easily removed, as described above.

Figure 6:
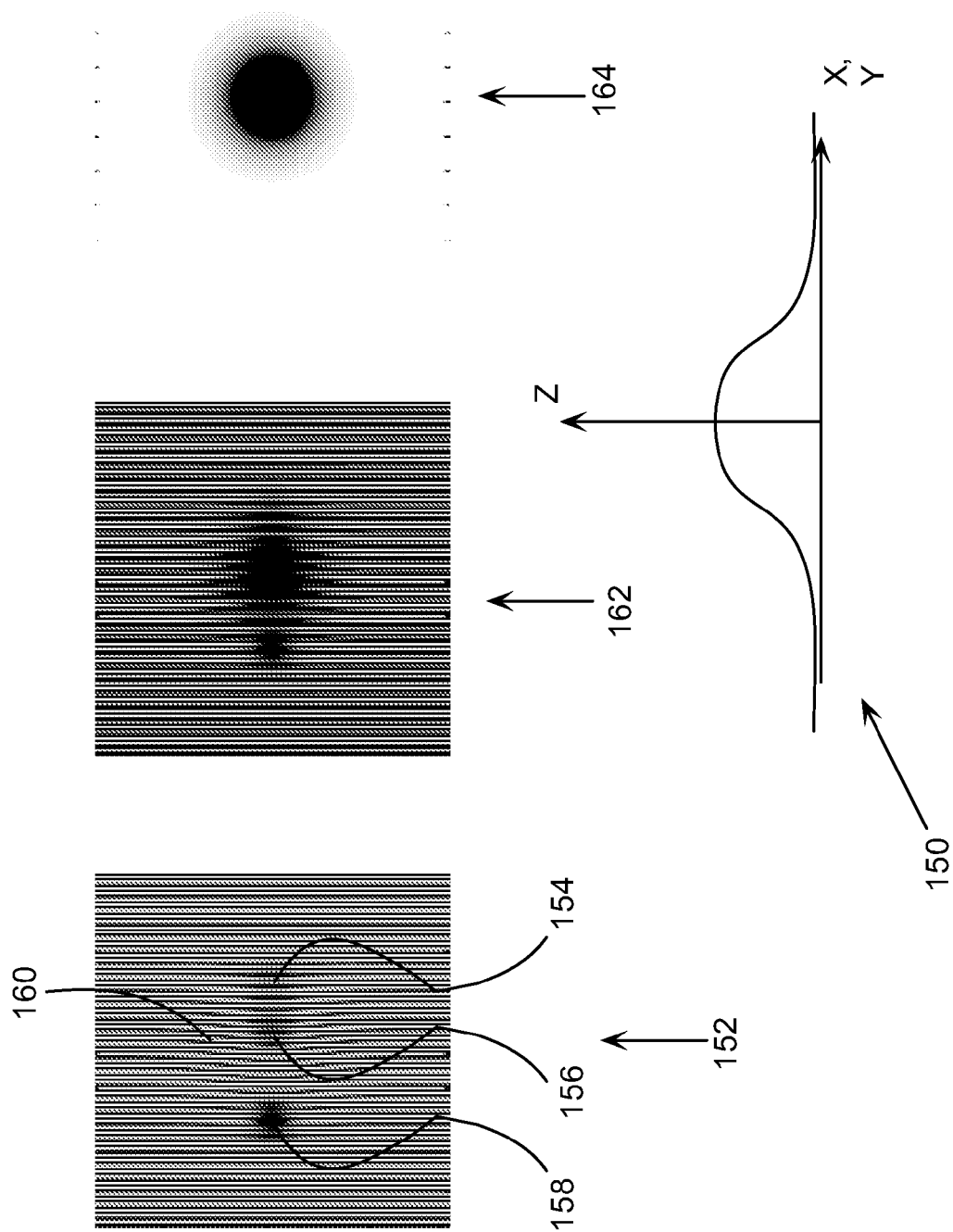
FIG. 6 shows schematic expected patterns generated by the system of FIG. 2, according to an embodiment of the present invention.

FIG. 6 shows schematic expected patterns generated by system 24, according to an embodiment of the present invention. Object 22 is assumed to be symmetrical about a central point. In the region of the central point object 22 is assumed to have a raised area, so that the object has a z vs. x and a z vs. y graph corresponding to a diagram 150.

A diagram 152 shows captured image 56. Image 56 has regions 154, 156, and 158 corresponding to respective different reflectivities 80%, 50%, and 30%, of areas of object 22. In other words, object 22 has three areas with different reflectivities, as well as the raised area at the center of the object. Diagram 152 shows the areas, as well as a distorted fringe area 160 corresponding to the raised central area of object 22.

A diagram 162 shows composite image 60, formed by multiplying captured image 56 with reference grating 58.

A diagram 164 shows the intensities calculated by processor 28, according to mapping step 110 of flowchart 100. It is seen that diagram 150 corresponds with diagram 164.

Figure 7:
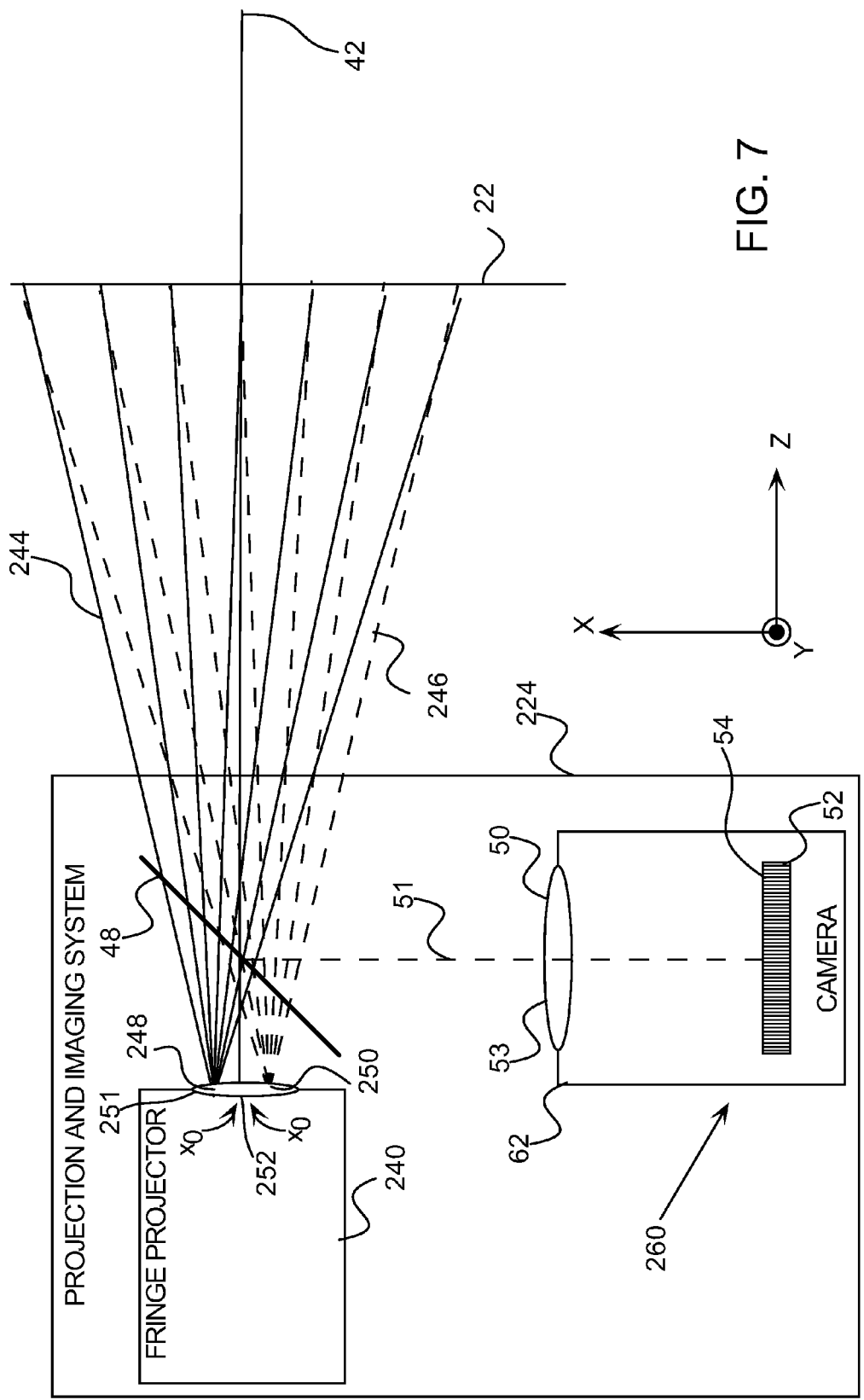
FIG. 7 is a schematic block diagram of an alternative projection and imaging system, according to an embodiment of the present invention.

FIG. 7 is a schematic block diagram of an alternative projection and imaging system 224, according to an embodiment of the present invention. Apart from the differences described below, the operation of system 224 is generally similar to that of system 24 (FIG. 2), and elements indicated by the same reference numerals in both systems 24 and 224 are generally similar in construction and in operation.

In contrast to system 24, system 224 generates an additive Moiré pattern. In order to generate the additive pattern, a fringe projector 240 is configured to project two separate sets of fringes 244, 246, rather than the single set of fringes 44 of system 24. Each set of fringes has substantially the same properties as fringes 44, described above, and may be formed by any of the methods referred to herein. While there is no necessity that the two sets are formed by the same method, this is typically the case. If, as is explained below in the section "Generation of Fringes," a first pair of coherent sources are used to generate set of fringes 244, and a second pair of coherent sources are used to generate set of fringes 246. The two pairs of sources are typically configured to be incoherent with respect to each other. Alternatively, the two pairs of sources may be configured to be coherent. Having the two pairs of sources coherent generates frequency doubling and interference effects, which in turn form a pattern on the object having an additive Moiré pattern component and a multiplicative Moiré pattern component. The two components may be resolved by appropriate filtering.

By way of example, the two sets of fringes are herein assumed to be symmetrically arranged with respect to axis of projection 42. The symmetrical arrangement is assumed to be by having fringes 244 effectively diverging from a first point 248 of projector 240, and fringes 246 effectively diverging from a second point 250 of the projector. The first and second points are implemented to be equidistant, in an x direction, by $x_0$, from axis 42. A central point 252, lying on axis 42, is between first point 248 and second point 250.

The separation between the first and second points may be implemented using a single lens 251 that is configured to have two separated numerical apertures by methods known in the art. Alternatively the separation may be implemented using a beam splitter and two lenses, or by using two separate lenses, or by any other means known in the art. The separation between the points is selected to provide the fringes with a given spatial frequency and a given visibility variation with distance.

Beamsplitter 48 is oriented so that camera axis 51 and projection axis 42 reflect to each other. Typically, camera 62 is positioned so that aperture 53 and central point 252 are equidistant from beamsplitter 48.

In contrast to system 24, in system 224 no physical or digital reference grating is used by camera 62. Rather, an additive composite image 260 of the two sets of fringes projected onto object 22 is formed at surface of array 52, and the array captures the composite image.

Moreover, since the depth information in system 224 is present in the pattern reflected from the object itself and is not dependent on camera parameters, there is no need for knowledge of camera parameters such as the beamsplitter and the camera positions. (The analysis below, with regard to FIGS. 8 and 12, uses this property by positioning the point between two fringe projectors at the coordinate axes origin.)

Figure 8:
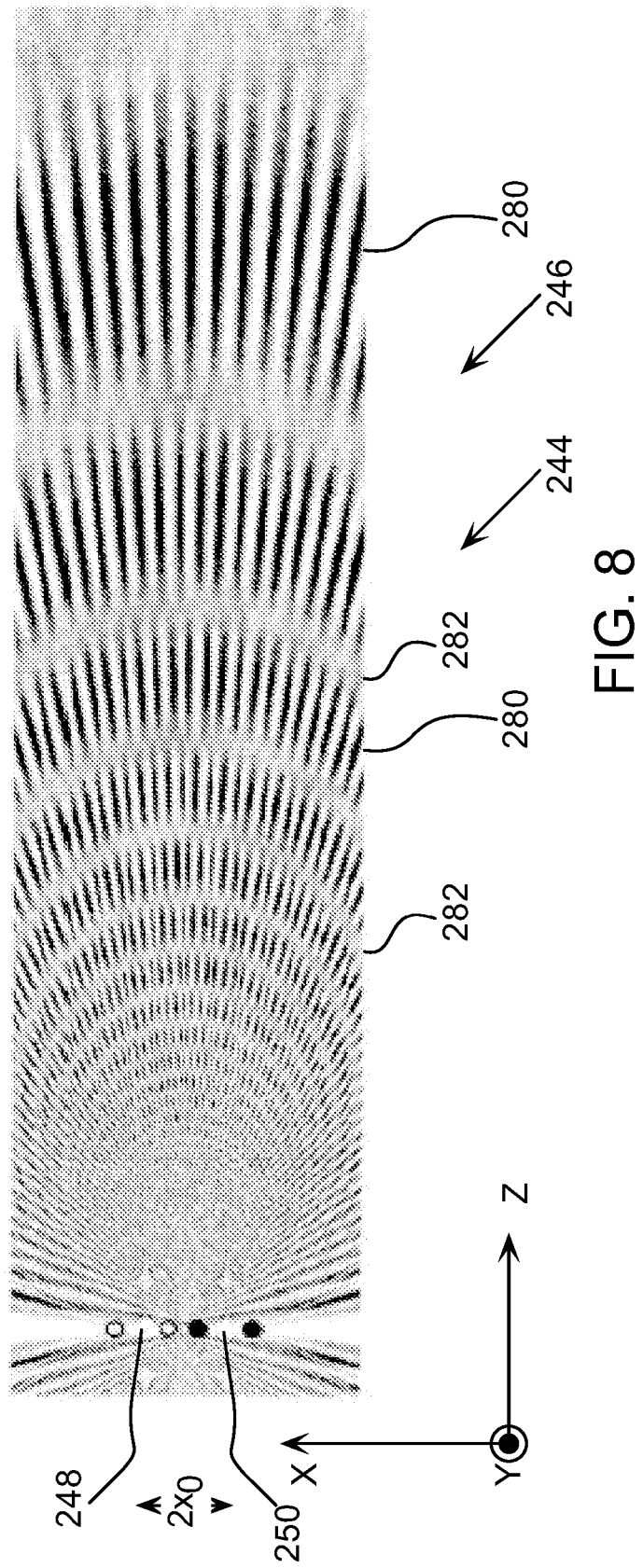
FIG. 8 is a schematic diagram illustrating an intensity distribution formed by two sets of fringes, according to an embodiment of the present invention.

FIG. 8 is a schematic diagram illustrating the intensity distribution formed by the two sets of fringes 244, 246, according to an embodiment of the present invention. Each set of fringes is assumed to be generated by a pair of coherent radiation sources. The fringes diverge from points 248, 250, that are centered between respective pairs of coherent sources. Since there is a non-zero separation $2x_0$ between first and second points 248 and 250, there are regions 280 wherein the two sets of fringes are in-phase, so that the fringes in regions 280 have double the maximum and double the minimum intensities of one of the sets of fringes. There are also regions 282 wherein the two sets of fringes are out-of-phase, so that the fringes in regions 282 form regions of uniform intensity. The separation between adjacent in-phase regions 280, and between adjacent out-of-phase regions 282, depends on the separation $2x_0$ of first and second points 248 and 250: as $x_0$ decreases, the separation between adjacent regions increases. (The relationship is explained in more detail below.)

FIGS. 9 and 10 are schematic diagrams of the projections of sets of fringes 244, 246, according to respective embodiments of the present invention. In FIG. 9, the distance between points 248, 250 is relatively large; in FIG. 10 the distance is relatively small. The diagrams in FIGS. 9 and 10 are assumed to be derived from object 22, having reflectivities as described above with reference to FIG. 6. One can observe the ambiguity in FIG. 9 that needs to be removed by other means, whereas in FIG. 10, the visibility indication of object distance is monotonic.

In FIG. 9, diagrams 284, 285 show the fringes separately (i.e., fringes 244 in diagram 284 and fringes 246 in diagram 285); a diagram 286 shows the two sets of fringes under addition.

In FIG. 10, diagrams 287, 288 show the fringes separately, and a diagram 289 shows the two sets of fringes under addition.

Using the definitions of terms in equations (1)-(3) and (7) above, and taking account of the symmetrical arrangement of projector 240, expressions for the respective images of the two sets of fringes are:

$$I_{244} = R_{eff}(x, y)(1 + \cos(kx + ah)) \text{ and} \quad (11)$$

$$I_{246} = R_{eff}(x, y)(1 + \cos(kx - ah))$$

where $I_{244}$ is the intensity of fringes 244, and $I_{246}$ is the intensity of fringes 246.

From equation (11), the intensity of composite image 260 is given by:

$$\begin{aligned} I &= I_{244} + I_{246} \quad &(12)\\ &= R_{eff}(x, y)(1 + \cos(kx + ah)) + R_{eff}(x, y)(1 + \cos(kx - ah))\\ &= 2R_{eff}(x, y) + R_{eff}(x, y)(\cos(kx + ah) + \cos(kx - ah))\\ &= 2R_{eff}(x, y)(1 + \cos(kx)\cos(ah)) \end{aligned}$$

Inspection of equation (12) shows that the intensity I of composite image 260 varies sinusoidally around a mean value determined by the reflectivity $R_{eff}$. An amplitude of the variation is given by the depth h and the geometrical constant a. In embodiments of the present invention the amplitude of the variation may be configured to be monotonic for object 22 by setting the separation between points 248 and 250, $2x_0$, to be small enough so that the values of h of the object do not cover more than one in-phase region and one out-of-phase region.

From equation (12) the intensity I has terms with frequencies 0 and k. The output of array 52 has corresponding spatial frequency components so that if a low pass filter blocking all but the zero frequency terms is applied to the output of array 52, a low pass filtered amplitude $A_0$ is given by:

$$A_0 = 2R_{eff}(x,y) \quad (13)$$

In addition, filtering the output around a frequency corresponding to k (assuming as before that $$\frac{ah(x, y)}{k}$$

does not have spatial frequencies higher than k) gives an amplitude $A_1$ of the filtered output:

$$A_1 = R_{eff}\cos(ah) \quad (14)$$

Dividing equation (14) by equation (13) and rearranging gives:

$$\cos(ah) = 2\frac{A_1}{A_0} \quad (15)$$

As for equation (9), equation (15) may be rewritten to give a single value for h:

$$h = \frac{1}{a}\arccos\left(2\frac{A_1}{A_0}\right) \quad (16)$$

FIG. 11 shows schematic diagrams illustrating the factors used in equations (13)-(16), according to an embodiment of the present invention. A diagram 290 illustrates $A_0$ in equation (13), a diagram 291 illustrates $A_1$ in equation (14). A diagram 292 illustrates the division of the two equations, generating equations (15) and (16).

An alternative method (to applying equation (15)) for determining cos(ah) follows.

The visibility V of a region is defined as:

$$V = \left(\frac{I_{max} - I_{min}}{I_{max} + I_{min}}\right) \quad (17)$$

where $I_{max}$ is a maximum intensity in the region, and $I_{min}$ is a minimum intensity in the region.

Visibility as defined by equation (17) has a range between 0 to 1. To simplify notation, it is beneficial to use equation (18) below to define $I_{max}$ and $I_{min}$. In this case, V ranges between −1 and 1. The range extension is here for convenience purposes. (In a measurement, one may only get values between 0 and 1, and negative values will be mapped onto the corresponding positive ones.)

The expression for visibility may be applied to the image captured by array 52, where it is assumed that the region considered comprises at least one spatial period of the fringes imaged. Over the spatial period, it is also assumed that h does not change, and that the fringe separation does not vary with z. In this case, equation (12) gives:

$$I_{min} = 2R_{eff}(x, y)(1 - \cos(ah)) \text{ and} \quad (18)$$

$$I_{max} = 2R_{eff}(x, y)(1 + \cos(ah))$$

Substituting the expressions from equations (18) into equation (17) gives:

$$V = \left(\frac{4R_{eff}(x, y)\cos(ah)}{4R_{eff}(x, y)}\right) = \cos(ah) \quad (19)$$

Thus, the fringe visibility V gives the value of cos(ah) directly.

The above derivation of equation (19) (and of equation (16)) assumes that the separation of the imaged fringes at the camera does not vary with z. The fringes themselves typically separate nearly linearly with z, but this may be compensated for if the camera is situated sufficiently close to the projector.

FIG. 12 is a schematic diagram used in accounting for the changes of fringe visibility with z, according to an alternative embodiment of the present invention. In the following derivation, it is assumed that a first set of fringes generated in system 224 is a set of planes (containing the y-axis) radiating from point 248, and that a second set of fringes is a set of planes radiating from point 250. Points 248 and 250 act as centers of fringe projection. (The assumptions above are explained in the section "Generation of Fringes.") In addition, the intensity of the fringes is assumed to attenuate according to the inverse square law, and is also assumed to vary sinusoidally around the respective centers of projection.

The following derivation also assumes that axes coordinates are related to object 22 itself, i.e., are not mapped to array 52.

An intensity of the fringes at a physical point (x,z) on object 22 is given by equation (20):

$$I = R_{\textit{eff}}(x, y)\left[\frac{1+\cos(k'\alpha)}{(x-x_0)^2+z^2} + \frac{1+\cos(k'\beta)}{(x+x_0)^2+z^2}\right] \quad (20)$$

where $$\tan\alpha = \frac{x-x_0}{z} \approx \alpha,$$
$$\tan\beta = \frac{x+x_0}{z} \approx \beta,$$

and k' is an angular frequency of separation of the fringes.

k' and k (equation (1)) are related by the following equation:

$$k' = kz = \frac{2\pi z}{p} \quad (21)$$

where k is defined in equation (1), and
p is measured in a unit of length, such as mm.

If $x_0$ is assumed to be small, then on the z axis, where x=0, equation (20) can be approximated as:

$$I \approx \frac{R_{\textit{eff}}(x, y)}{z^2}\left[\left(1+\cos\left(k'\frac{x-x_0}{z}\right)\right) + \left(1+\cos\left(k'\frac{x+x_0}{z}\right)\right)\right] \quad (22)$$
$$= \frac{2R_{\textit{eff}}(x, y)}{z^2}\left[1+\cos\left(k'\frac{x}{z}\right)\cos\left(k'\frac{x_0}{z}\right)\right]$$

Applying equation (22) to the definition of visibility (equation (17), with a similar proviso concerning the range as that stated above) gives a local visibility at distance z from the x axis (z corresponding essentially to the measured object distance) given by equation (23):

$$V = \cos\left(k'\frac{x_0}{z}\right) \quad (23)$$

Equation (23) has been derived for the on axis case, where x=0. Those having ordinary skill in the art will be able to derive expressions for visibility for off axis cases, where x≠0. (As is illustrated qualitatively in FIG. 8 for in-phase regions and out-of-phase regions, regions for any given constant visibility V may be circles, centered on the z axis and passing through a central point between points 248 and 250.) While the description below uses the on axis derivation of equation (23), the off axis cases give similar results, and the results may be calculated for all possible values of (x,y) for x≠0.

Inspection of equation (23) shows that for given values of k' and $x_0$, V varies with z in a periodic manner. The type of periodic variation is visible qualitatively in FIG. 8. FIG. 8 and equation (23) show that as the value of z increases, the distance between adjacent out-of-phase regions 282 increases, in other words, that the spatial period of variation of V increases as z increase. This is also true for in-phase regions 280.

FIG. 13 shows graphs of V vs. z, corresponding to equation (23), for two different values of $x_0$, according to an embodiment of the present invention. In both cases k' is, by way of example, approximately equal to 2513. A graph 300 is for $x_0$=1 mm, and a graph 302 is for $x_0$=5 mm. For either graph, ranges of values of z, corresponding to locations relative to system 224, may be chosen wherein the variation of V is monotonic. For example, from graph 300 where $x_0$=1 mm, V is monotonic for values of z between approximately 800 mm and approximately 3000 mm; and from graph 302 where $x_0$=5 mm, V is monotonic for values of z between approximately 1000 mm and approximately 1300 mm, and is also monotonic between approximately 1300 mm and approximately 2000 mm.

The value of k' is typically selected according to the resolution, i.e., the pixel dimensions, of array 52, so that an appropriate period of the fringes is generated at object 22. For example, if the pixel dimensions of array 52 are 6 µm, then a period of the fringe image on the array may be assumed to be 12 µm for the fringes to be resolvable. If the system-object distance is 2 m, and camera 62 has an effective focal length of 5 mm, then the spatial period of separation of the fringes, p, at the object is approximately 4.8 mm. Using these values gives, from equation (21), k'≈2618.

Once a value of k' has been decided, the separation of projectors, $2x_0$, may be set to maximize the range of visibility V for a required range of values of z of object 22.

The value of V may vary between −1 and +1. Also, for a particular range of z, the value of $x_0$ may be selected so that the change of V is monotonic increasing, or is monotonic decreasing. In some embodiments the values of V (over the selected range of z) may be chosen to be either positive, or negative.

FIG. 14 shows exemplary graphs of V vs. z, corresponding to equation (23), for two different values of $x_0$, according to an embodiment of the present invention. Both graphs have values of V that are only positive for the selected range of z values from 500 mm to 3000 mm. A first graph 310 shows that V decreases monotonically with z; a second graph 312 shows that V increases monotonically with z.

Figure 15:
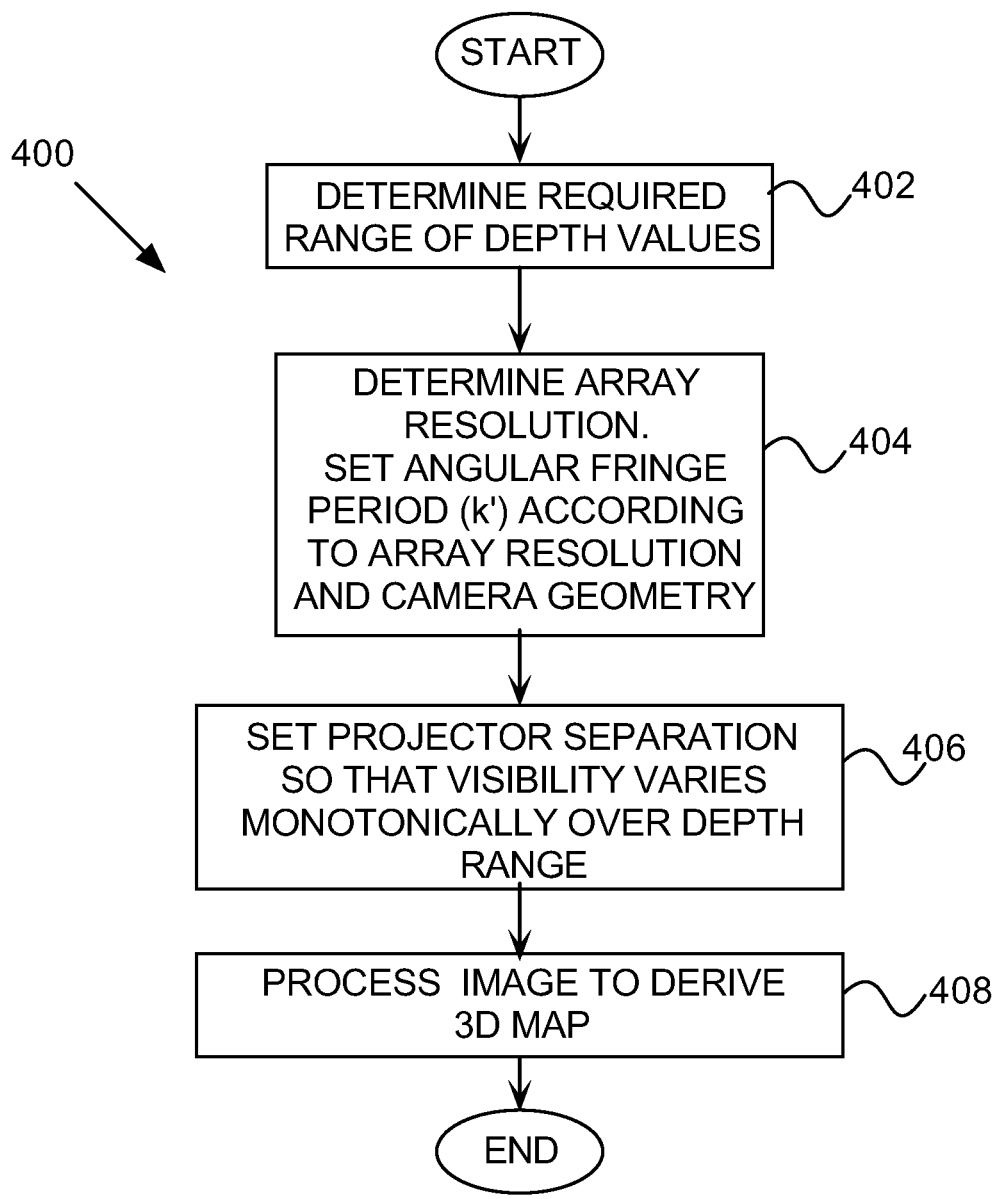
FIG. 15 is a flowchart showing steps implemented in operation of the system of FIG. 7, according to an embodiment of the present invention.

FIG. 15 is a flowchart 400 showing steps implemented in operation of system 224, according to an embodiment of the present invention. The steps of the flowchart apply the procedures described above with reference to FIGS. 8-14.

In an initial step 402, the desired range of z for an object which is to be mapped in 3D, is established. In other words, a minimum value of z and a maximum value of z for which system 224 is to be operative is determined.

In a fringe period step 404, the pixel dimensions of array 52, i.e., the resolution of the array, and the camera geometry and optical characteristics, typically including the camera's focal length, are used to select a value for k', the angular fringe period.

In a projector separation step 406, the value of $x_0$, setting the projector separation, is selected according to the desired range of values of z determined in initial step 402. This step uses equation (23) and the value of $x_0$ is typically chosen so that over the desired range of z the visibility varies monotonically. Alternatively, $x_0$ may be chosen so that over the desired range of z the visibility varies non-monotonically. Step 406 completes a setup phase of system 224.

In an operation step 408 of the system, images of object 22 are captured by array 52 and processor 28 analyzes the captured images. The analysis may use equation (16) or equation (19) in order to determine the depth h of each point of the object. Alternatively, the analysis may use equation (23), or analogous equations for off-axis points, to determine z for each point. From inspection of equations 19 and 23, it will be appreciated that visibility V varies with depth (h or z), and that measurement of V gives the depth.

It will be understood that, as for equation (10), equations (19) or (23) may be used regardless of whether the visibility varies monotonically or non-monotonically. However, ambiguities that may be caused by the non-monotonicity of embodiments of the present invention may be easily removed, as described above with respect to flowchart 100 (FIG. 5).

It will also be understood that application of equations (10), (19) or (23) only requires measurements of a locally unambiguous characteristic of the Moiré fringes generated. The embodiments described above provide examples where intensity is the locally unambiguous characteristic, and also where visibility is the locally unambiguous characteristic. Typically, the intensity is monotonic, and the visibility is also monotonic. Alternatively, as described above, the intensity may be non-monotonic and the visibility may also be non-monotonic.

It will be understood that there are other locally unambiguous characteristics, such as functions of intensity other than visibility, that may be used in embodiments of the present invention. These characteristics will be apparent to those having ordinary skill in the art, and are assumed to be comprised within the scope of the present invention.

Generation of Fringes

Projector 40 in system 24 projects one set of fringes. Projector 240 in system 224 projects two sets of fringes. Two methods for generating fringes are described hereinbelow, although other methods will be apparent to those having ordinary skill in the art, and these methods are also assumed to be included within the scope of the present invention.

a. Fringe Generation Using Young's Fringes

FIG. 16 and FIG. 17 are schematic diagrams illustrating formation of fringes using Young's method, according to an embodiment of the present invention. In FIG. 16 two radiation sources $S_i$, $S_2$ are coherent, and are separated by a distance s. Herein by way of example sources $S_i$, and $S_2$ are assumed to be point sources, although other configurations of the sources are possible, such as configuring the sources as parallel slits. A number of methods for forming the two coherent sources are known in the art and include, but are not limited to, methods based on Lloyd's mirror (where the sources are in antiphase), Fresnel's biprism, Billet's split lens, a Wollaston prism, as well as interferometers such as the Michelson interferometer. Alternatively, the output from a coherent radiator such as a laser diode may be split to form the two coherent sources assumed herein.

In the following explanation sources $S_1$, $S_2$, are assumed to be in-phase.

Radiation from the sources interferes, and for any point P in a region in proximity to sources $S_1$, $S_2$, an equation for constructive interference is:

$$PS_1 - PS_2 = n\lambda \quad (24)$$

where n is an integer, and
$\lambda$ is the wavelength of the radiation from $S_1$, $S_2$.
An equation for destructive interference at point P is:

$$PS_1 - PS_2 = \left(n + \frac{1}{2}\right)\lambda \quad (25)$$

Equation (24) represents a set of high intensity hyperboloids, having foci $S_1$, $S_2$. Equation (25) represents a set of zero intensity hyperboloids, interleaving the hyperboloids of equation (24) and having the same foci. FIG. 16 shows interleaved sets of bright and dark hyperbolas, corresponding to the interleaved hyperboloids of equations (24) and (25), that are generated by sources $S_i$, $S_2$, for an x-z plane containing the sources. An x-y plane 450, distant Z from the sources, is assumed to receive the radiation from the sources.

FIG. 17 illustrates in a diagram 452 the radiation intensity at plane 450. At plane 450 the interleaved hyperboloids of equations (24) and (25) form interleaved bright and dark hyperbolas. If plane 450 is sufficiently distant from sources $S_i$, $S_2$, i.e., if $$Z \gg s \quad (26)$$

the interleaved hyperbolas form sets of parallel lines, as illustrated in a diagram 454.

Thus, so long as the relation of expression (26) holds, sources $S_i$, $S_2$ generate sets of line fringes, parallel to the y-axis, that radiate from a point centered on $S_1S_2$. At distance Z, the period p of the fringes is:

$$p = \frac{Z}{s}\lambda \quad (27)$$

b. Fringe Generation Using a Small Numerical Aperture (NA) Projector

Figure 18:
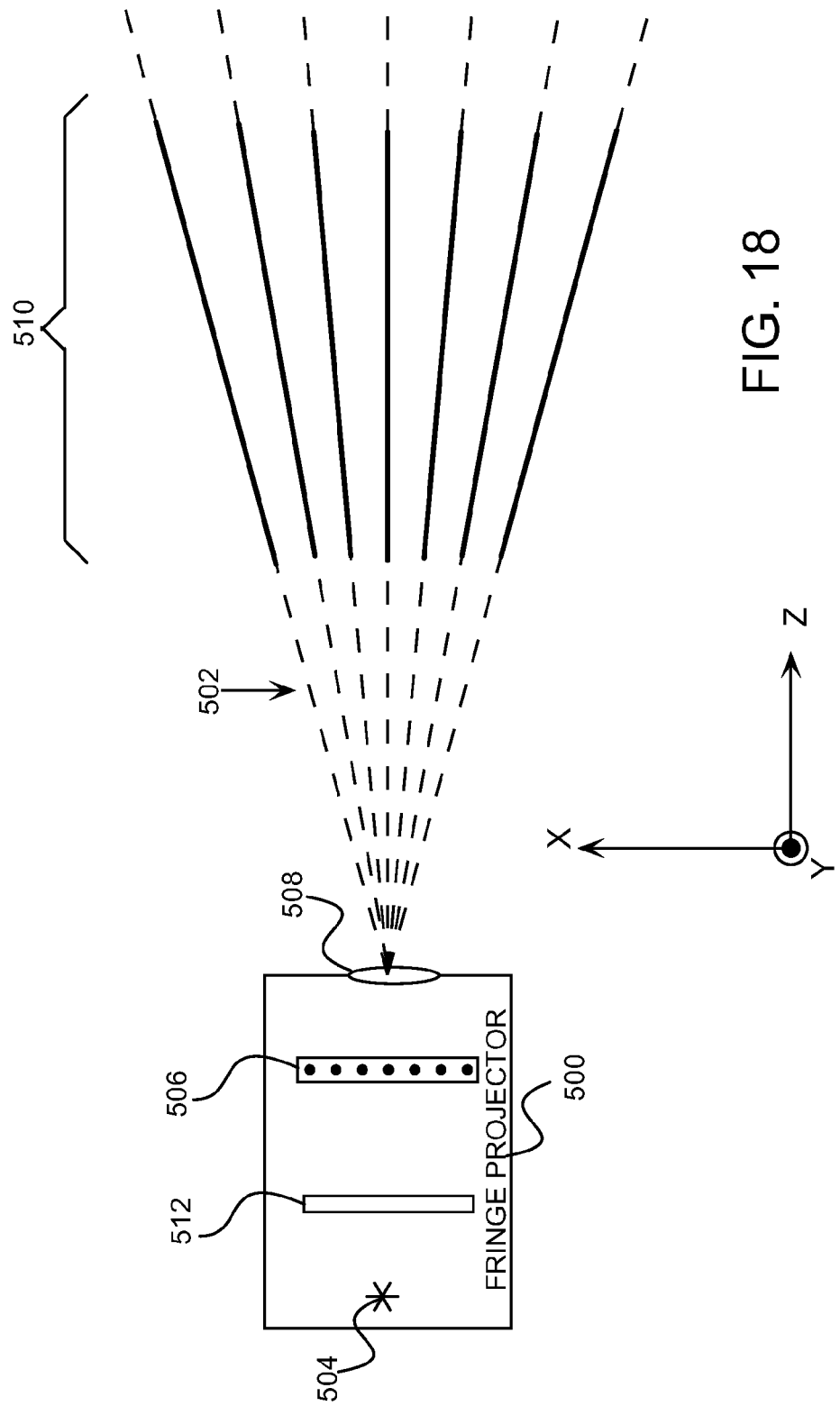
FIG. 18 is a schematic diagram illustrating formation of fringes by a fringe projector, according to an embodiment of the present invention.

FIG. 18 is a schematic diagram illustrating formation of fringes by a fringe projector 500, according to an embodiment of the present invention. Fringe projector 500 projects a set of fringes 502, for use by projection and imaging systems described herein. The projector comprises a radiation source 504, which irradiates a grating 506. The grating comprises interleaved transparent and opaque straight lines, assumed herein to be parallel to the y axis. Projector 500 comprises optics 508, which project radiation from the grating generally in the positive z direction.

Alternatively, a cylindrical lens array may be coupled to project a radiation source via an imaging system, the imaging system being selected according to the numerical aperture of the lens array. Such an alternative arrangement improves the efficiency of utilization of the radiation source.

In order for the projected radiation to generate fringes over a relatively large depth of field 510, i.e., over a relatively large range of values of z, a numerical aperture (NA) of optics 508 is typically small. Typically, in order to overcome the reduction in efficiency engendered by the small NA, projector 500 comprises one or more optical elements 512, which are designed to concentrate the radiation from source 504 onto the aperture of optics 508. In one embodiment elements 512 comprise a tailored diffuser.

It will be appreciated that, for the two exemplary methods of fringe generation described above, the intensity of the fringes varies, to a good approximation, with the inverse square of the distance from an effective point of projection, the point of divergence, of the fringes.

Typically, in system 24 and system 224, as measured in a plane orthogonal to the direction of propagation of the fringes, the profile of the intensity of the fringes is configured to be sinusoidal. Such a sinusoidal variation minimizes the spatial frequencies generated in the image. In addition, using sinusoidal fringes minimizes distortion when the fringes transfer through an imaging section of the system. However, there is no necessity for the fringe profile to be sinusoidal, and other profiles may improve the versatility of the system, for example by allowing the visibility to be tailored to z. It will be understood that non-sinusoidal profiles increase the spatial frequencies in the image, leading to corresponding increased requirements in sampling the array capturing the image.

Returning to equation (23) and the graphs of FIG. 13, it will be appreciated that the value of visibility V can take positive and negative values ($\leq |1|$). Regions having the same absolute visibility, but differing in sign, correspond to regions having a contrast inversion, i.e., there is an exchange between the positions of bright and dark fringes. Since the fringes are imaged on array 52, it will be appreciated that processor 28 may identify any contrast inversions by identifying pixels of the array having bright images, and those having dark images. Thus, a system such as system 224 may be configured to have a range of z that varies monotonically with V, where V has values of V between +1 and −1.

It will be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. A method for three-dimensional mapping of an object, comprising:
projecting with a projector a set of fringes on the object;
capturing an image of the object in a camera, wherein the image contains a Moiré pattern associated with the object, and a visibility of the Moiré pattern varies with a distance of the object from the camera,
wherein the visibility of the pattern in a region is defined as a relation between a maximum intensity in the region and a minimum intensity in the region; and
processing the captured image so as to detect the Moiré pattern associated with the object and so as to extract depth information from the visibility of the Moiré pattern.

2. The method according to claim 1, wherein the set of fringes comprises a single set of fringes diverging from an aperture of the projector.

3. The method according to claim 2, wherein processing the captured image comprises multiplying the captured image with a reference grating to form a composite image comprising the Moiré pattern.

4. The method according to claim 2, wherein processing the captured image comprises multiplying the captured image with a digital representation of a reference grating to form a composite image comprising the Moiré pattern.

5. The method according to claim 1, wherein processing the captured image comprises identifying and removing a reflectivity component of the object in the captured image.

6. The method according to claim 5, wherein the set of fringes have a spatial frequency, and wherein identifying and removing the reflectivity component comprises filtering a composite image derived from the captured image around a frequency corresponding to twice the spatial frequency.

7. The method according to claim 1, wherein the set of fringes have a spatial frequency, and wherein detecting the Moiré pattern comprises filtering a composite image derived from the captured image in a low pass filter blocking frequencies greater than and including a frequency corresponding to the spatial frequency.

8. The method according to claim 1, wherein the set of fringes have a spatial period at the object, and wherein an effective displacement of the fringes is less than the spatial period.

9. The method according to claim 1, wherein projecting the set of fringes comprises projecting the set of fringes via a beamsplitter, and wherein capturing the image comprises capturing radiation from the object via the beamsplitter, and wherein detecting the Moiré pattern comprises orienting the beamsplitter to form the Moiré pattern.

10. The method according to claim 1, wherein the set of fringes comprises a first set of fringes and a second set of fringes configured to generate the Moiré pattern.

11. The method according to claim 10, wherein the set of fringes have a spatial frequency, and wherein processing the captured image comprises identifying and removing a reflectivity component by filtering a composite image derived from the captured image at a frequency corresponding to the spatial frequency.

12. The method according to claim 1, wherein processing the image comprises extracting the depth information from a function of an intensity of the Moiré pattern.

13. The method according to claim 12, wherein the function comprises the intensity.

14. The method according to claim 1, wherein the visibility of the Moiré pattern varies monotonically with locations on the object.

15. The method according to claim 1, wherein the visibility of the Moiré pattern varies non-monotonically with locations on the object.

16. The method according to claim 1, wherein projecting the set of fringes comprises configuring the projector to use Young's method to generate the set of fringes.

17. The method according to claim 1, wherein the projector comprises a single projection lens having two numerical apertures with a separation therebetween selected to provide the fringes with a given spatial frequency and a given visibility variation with distance.

18. The method according to claim 1, wherein the projector comprises a cylindrical lens array.

19. Apparatus for three-dimensional mapping of an object, comprising:
a projector which is configured to project a single set of fringes on the object;
a camera which is configured to capture an image of the object, wherein the image contains a Moiré pattern associated with the object, and a visibility of the Moiré pattern varies with a distance of the object from the camera,
wherein the visibility of the pattern in a region is defined as a relation between a maximum intensity in the region and a minimum intensity in the region; and a processor which is configured to process the captured image so as to detect the Moiré pattern associated with the object and so as to extract depth information from the visibility of the Moiré pattern.

20. The apparatus according to claim 19, and comprising a reference grating located at an image plane of the camera, and wherein processing the captured image comprises multiplying the captured image with the reference grating to form a composite image comprising the Moiré pattern.

21. The apparatus according to claim 19, wherein processing the captured image comprises multiplying the captured image with a digital representation of a reference grating to form a composite image comprising the Moiré pattern.

22. The apparatus according to claim 19, wherein the single set of fringes have a frequency of repetition, and comprising identifying and removing a reflectivity component of the object in the captured image by filtering a composite image derived from the captured image at a frequency corresponding to twice the frequency of repetition.

23. The apparatus according to claim 19, wherein the single set of fringes have a spatial frequency, and wherein detecting the Moiré pattern comprises filtering a composite image derived from the captured image in a low pass filter blocking frequencies greater than and including a frequency corresponding to the spatial frequency.

24. The apparatus according to claim 19, wherein the single set of fringes have a spatial period at the object, and wherein an effective displacement of the fringes is less than the spatial period.

25. The apparatus according to claim 19, and comprising a beamsplitter, wherein projecting the single set of fringes comprises projecting the fringes via the beamsplitter, and wherein capturing the image comprises capturing radiation from the object via the beamsplitter, and wherein detecting the Moiré pattern comprises orienting the beamsplitter to form the Moiré pattern.

26. The apparatus according to claim 19, wherein the processor is configured to extract the depth information from a function of an intensity of the Moiré pattern.

27. The apparatus according to claim 19, wherein the visibility of the Moiré pattern varies monotonically with locations on the object.

28. The apparatus according to claim 19, wherein the visibility of the Moiré pattern varies non-monotonically with locations on the object.

29. Apparatus for three-dimensional mapping of an object, comprising:
   a projector which is configured to project a first set of fringes and a second set of fringes on the object;
   a camera which is configured to capture an image of the object, wherein the image contains a Moiré pattern associated with the object, and a visibility of the Moiré pattern varies with a distance of the object from the camera,
   wherein the visibility of the pattern in a region is defined as a relation between a maximum intensity in the region and a minimum intensity in the region; and
   a processor which is configured to process the captured image so as to detect the Moiré pattern associated with the object and so as to extract depth information from the visibility of the Moiré pattern.

30. The apparatus according to claim 29, wherein the first set of fringes and the second set of fringes are configured to generate the Moiré pattern.

31. The apparatus according to claim 29, wherein the first and second sets of fringes have a spatial frequency, and wherein processing the captured image comprises identifying and removing a reflectivity component by filtering a composite image derived from the captured image at a frequency corresponding to the spatial frequency.

32. The apparatus according to claim 29, wherein the the processor is configured to extract the depth information from comprises a function of an intensity of the Moiré pattern.

33. The apparatus according to claim 29, wherein the visibility of the Moiré pattern varies monotonically with locations on the object.

34. The apparatus according to claim 29, wherein the visibility of the Moiré pattern varies non-monotonically with locations on the object.

* * * * *